Sept. 9, 1952 R. W. JOHNSON 2,609,982
FLUID DISPENSING MACHINE

Filed Sept. 24, 1947 16 Sheets-Sheet 1

ROBERT W. JOHNSON.
INVENTOR.

BY Beale and Jones

ATTORNEYS

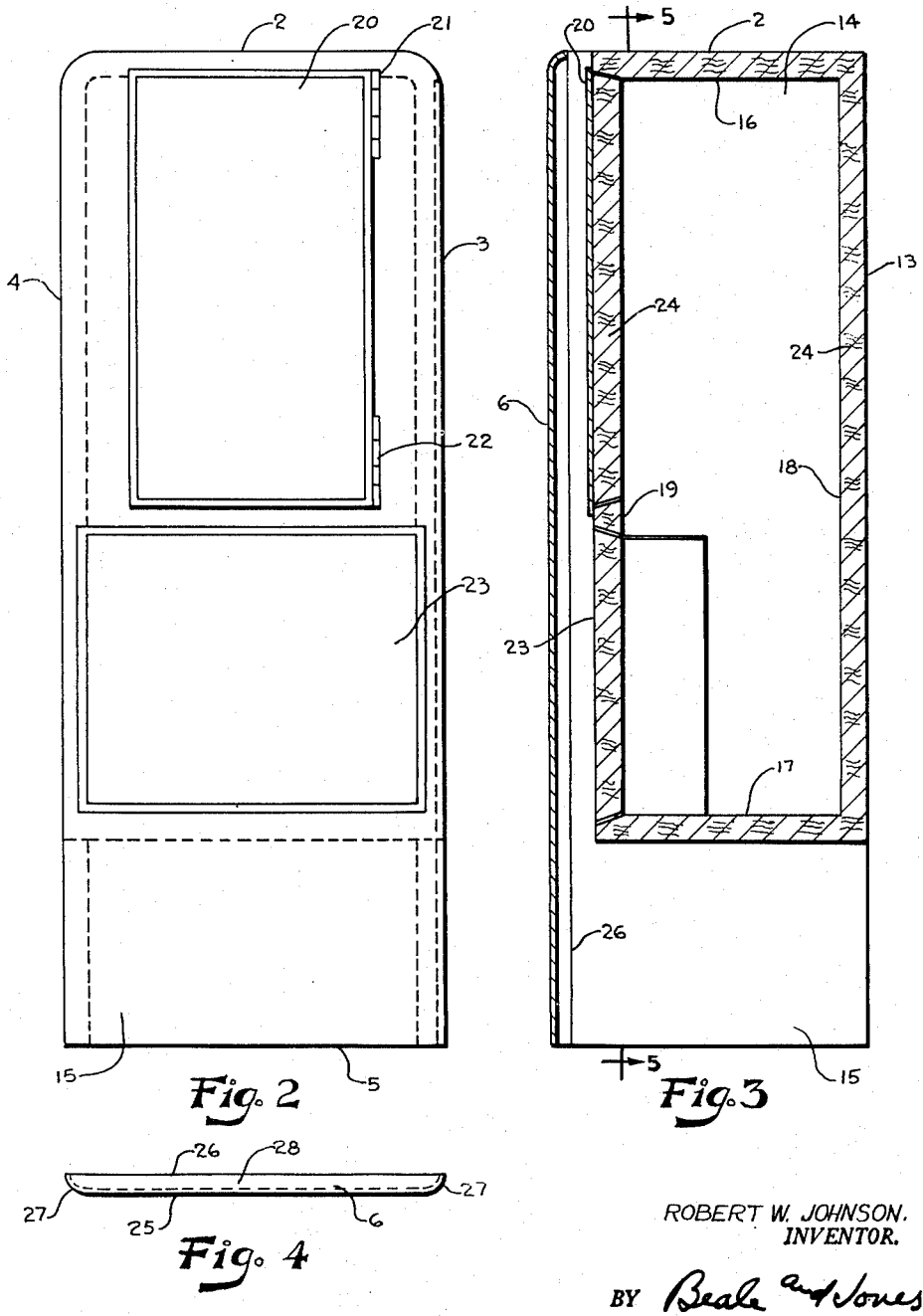

Sept. 9, 1952 R. W. JOHNSON 2,609,982
FLUID DISPENSING MACHINE
Filed Sept. 24, 1947 16 Sheets-Sheet 3

ROBERT W. JOHNSON.
INVENTOR.
BY Beale and Jones.
ATTORNEYS.

Sept. 9, 1952     R. W. JOHNSON     2,609,982
FLUID DISPENSING MACHINE

Filed Sept. 24, 1947                              16 Sheets-Sheet 4

ROBERT W. JOHNSON,
INVENTOR.

BY Beale and Jones
ATTORNEYS.

Sept. 9, 1952  R. W. JOHNSON  2,609,982
FLUID DISPENSING MACHINE
Filed Sept. 24, 1947  16 Sheets-Sheet 5

ROBERT W. JOHNSON.
INVENTOR.

BY Beale and Jones.
ATTORNEYS.

Sept. 9, 1952 R. W. JOHNSON 2,609,982
FLUID DISPENSING MACHINE
Filed Sept. 24, 1947 16 Sheets-Sheet 7

ROBERT W. JOHNSON.
INVENTOR.

BY Beale and Jones
ATTORNEYS.

Sept. 9, 1952  R. W. JOHNSON  2,609,982
FLUID DISPENSING MACHINE
Filed Sept. 24, 1947  16 Sheets-Sheet 9

ROBERT W. JOHNSON.
INVENTOR.
BY Beale and Jones.
ATTORNEYS.

Sept. 9, 1952  R. W. JOHNSON  2,609,982
FLUID DISPENSING MACHINE
Filed Sept. 24, 1947  16 Sheets-Sheet 10

ROBERT W. JOHNSON,
INVENTOR.

BY Beal and Jones
ATTORNEYS.

Sept. 9, 1952 — R. W. JOHNSON — 2,609,982
FLUID DISPENSING MACHINE
Filed Sept. 24, 1947 — 16 Sheets-Sheet 12

ROBERT W. JOHNSON
INVENTOR.

BY Beale and Jones,

ATTORNEYS.

Sept. 9, 1952     R. W. JOHNSON     2,609,982
FLUID DISPENSING MACHINE
Filed Sept. 24, 1947     16 Sheets-Sheet 15
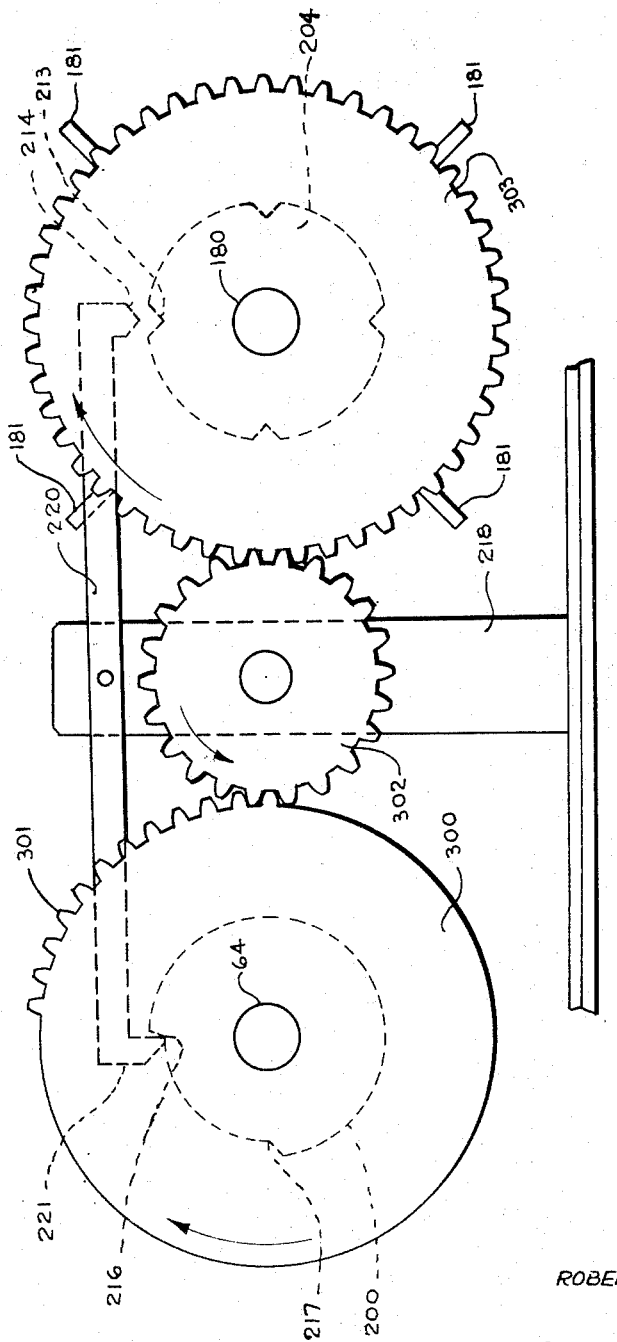
ROBERT W. JOHNSON.
INVENTOR.
BY Beale and Jones.
ATTORNEYS.

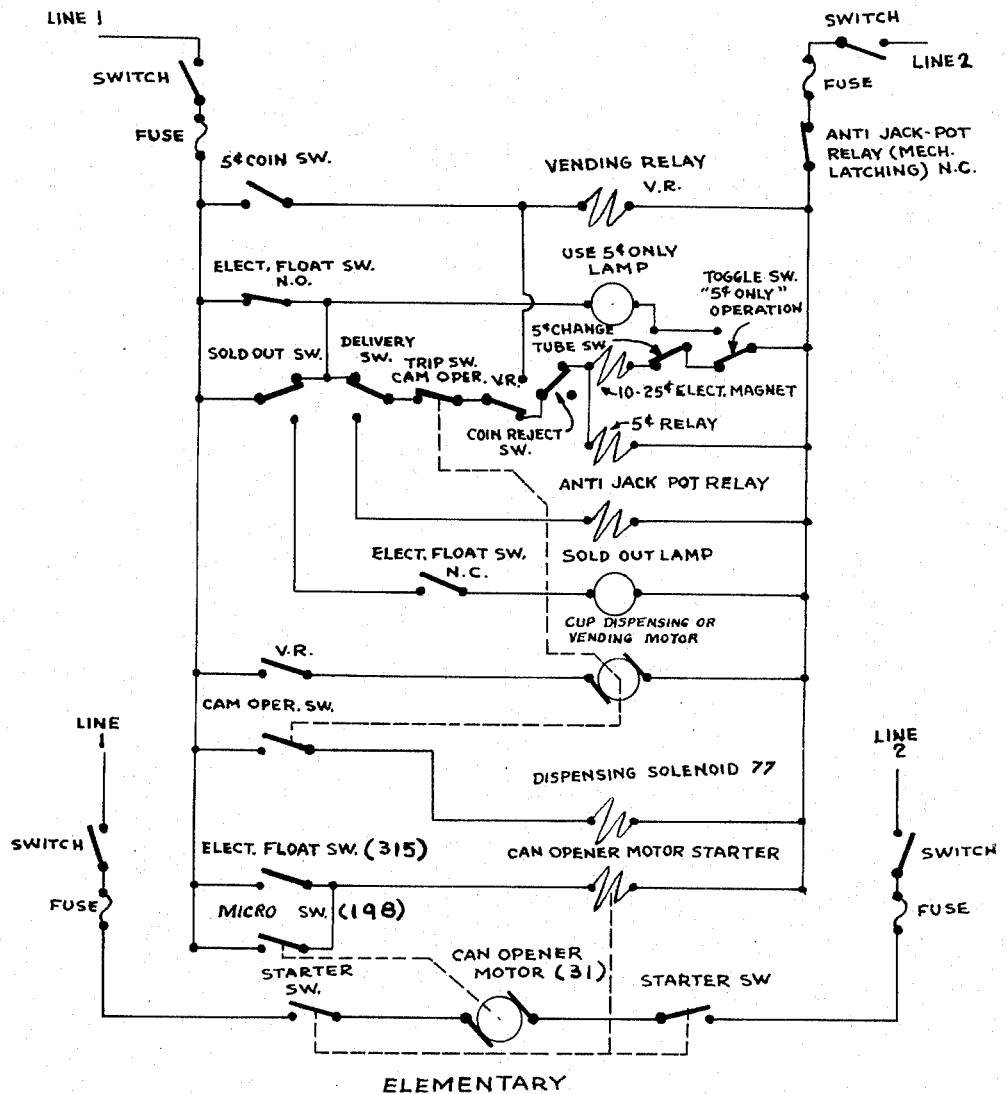

Patented Sept. 9, 1952

2,609,982

UNITED STATES PATENT OFFICE 2,609,982

FLUID DISPENSING MACHINE

Robert W. Johnson, Lakeland, Fla.

Application September 24, 1947, Serial No. 775,933

22 Claims. (Cl. 225—21)

My invention relates to a fluid dispensing machine and more particularly such a machine which is adapted to dispense measured quantities of a fluid from a reservoir, the contents of which are replenished as needed from a supply of canned fluids. More particularly, my invention relates to an arrangement whereby a plurality of sealed cans of fluid such as a beverage are maintained under refrigerating conditions in a chamber wherein, responsive to withdrawals from a reservoir, one of the cans is moved into a predetermined position, opened and the contents discharged into said reservoir, from which the fluid contents may be dispensed a measured quantity at a time.

There are on the market and in use at the present time a number of varieties of coin-operated, beverage-dispensing machines. Some of these operate by individually dispensing the contents of bottled "soft drinks," while others dispense carbonated or synthetic beverages from a vat or reservoir the liquid contents of which consists of a syrup, a flavoring extract and a diluent, generally water which is generally carbonated and mixed within the reservoir. Such beverages serve a useful purpose and are in considerable demand as thirst-quenchers. All of such devices dispense automatically in response to coin-operated mechanism.

So far as I am aware no such prior art device has been successful in dispensing natural fruit juices and none has dispensed the contents of a sealed can. The dispensing of fruit and vegetable juices has heretofore presented certain insuperable difficulties. Juice freshly pressed from fruit or vegetables such as oranges, grapefruit, apples, pineapples, tomatoes and the like has a pleasing taste. When permitted to stand, however, even under chilling conditions, chemical, bacteriological, and enzymic decomposition sets in causing sedimentation, gasification, and marked deterioration in the taste, quality and nutritional value of the juice. These characteristics of other than perfectly fresh juices caused non-uniform, distasteful and unsanitary drinks to result when any attempt was made to dispense fresh juices in any type of automatic dispensing machine.

By careful research and careful processing packers of fruits and vegetables have learned how to can and preserve fresh fruit and vegetable juices while capturing and retaining in the canned product almost every bit of the original flavor and aroma of the fresh fruit or vegetable. Moreover, modern scientific canning preserves the nutritional and vitamin qualities of the perfectly ripe fruit or vegetable—something which is soon lost when either the original fruit or vegetable or the juice therefrom is permitted to age or stand exposed to the atmosphere.

My invention has for one of its objects the provision of an automatic dispensing machine which will permit the consuming public to purchase a cupful of a beverage which is dispensed from a relatively small reservoir, the fluid contents of which are replaced, automatically and as needed, from the contents of sealed cans. A further object of my invention is the supplying to the reservoir of a fluid or beverage, preferably fruit or vegetable juice freshly released from a sealed can which contains the beverage or fruit or vegetable juice, with its original flavor, aroma, and nutritional value, practically unimpaired.

A still further object of my invention is the provision of a cabinet which contains a refrigerated compartment wherein is maintained a supply of chilled sealed cans, each containing a beverage or fruit or vegetable juice, the said compartment also being provided with an arrangement of elements which will permit one or several of the cans to be moved into place, punctured, and to discharge its or their fluid contents into a sanitary reservoir from which measured amounts of the fluid may be withdrawn and dispensed into a cup, all in response to coin-operated control devices. A still further object is the provision of such a cabinet which will provide ready access to the interior of the refrigerated compartment for removing empty cans and replacing them with full ones and for removing and cleaning the relatively few parts which are exposed to contact with the fluid being dispensed. The term "sealed can" as used herein is without intended limitation as to the component material of the container, whether sheet metal or other, and generally includes any sealed container having a portion susceptible to punching, puncturing or other engaging action to open a dispensing aperture.

An indirect but important object of my invention is the conservation of natural resources and the resultant contribution to the health and welfare of the consuming public by making it possible, by canning and preserving, to store up large quantities of fruit and vegetable juices during the bearing season of the respective fruit or vegetable and to convey such stored-up juices to the purchasing public economically, simply, under sanitary conditions and with a minimum of handling. A still further object is the elimination of the waste and excessive handling attendant upon the shipment of the whole fruit or vegetable to distribution centers such as food stores, soda fountains, and the like, wherein the whole fruit or vegetable is squeezed into a glass in response to the order of the consumer. Shipment and distribution of the whole fruit or vegetable requires refrigerated cars, excessive handling, and is attended with a high degree of spoilage; moreover, the squeezing of the fresh fruit, even under the best regulated conditions, exposes both the fruit and the consumer to the danger of bacterial infection and diseases. It is an object to eliminate these disadvantages.

Other objects of my invention will be apparent as my description thereof proceeds. I shall now describe my invention with reference to the accompanying drawings, wherein like reference numerals relate to the same or similar elements and wherein:

Figure 2 is a front elevation of the cabinet with the exterior front door removed.

Figure 3 is a side elevation of the cabinet partly in cross-section as taken along the line 3—3 on Figure 1.

Figure 4 is a top plan view of the exterior front door of the cabinet.

Figure 10:
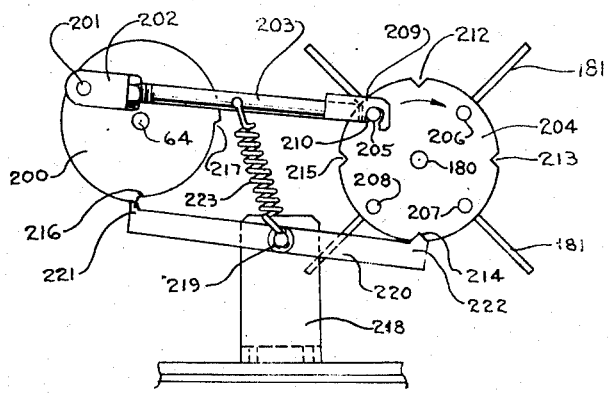
Figure 10 is a side elevation in detail of a can and spider assembly for imparting controlled and limited movement of a selected can.

Figures 17, 18, 19, and 20 are detailed views, similar to Figure 10, showing the relative position of the working parts during a 360° cycle of rotation of the cans.

Figure 11:
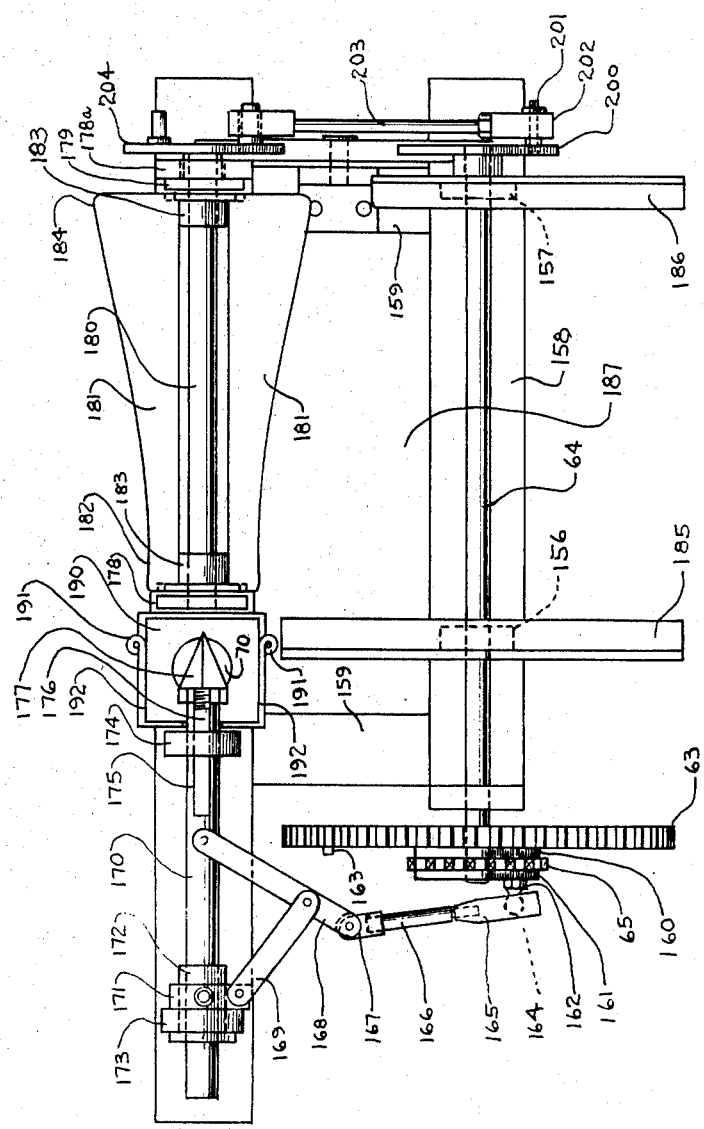
Figure 11 is a top plan view, in detail of an arrangement for holding and punching a selected can.
Figure 12:
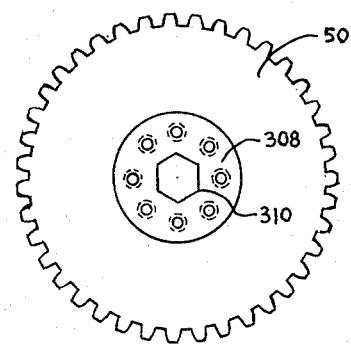
Figure 12 is a front plan view of one of the can-track sprockets provided with a clutch plate and shaft extension to permit manual cranking and movement of the can track during charging operations.

Figures 21, 22, 23, and 24 are detailed views similar to Figure 11 showing the relative positions of a can head and the can punch blade during a 360° cycle of rotation of the can-punching drive sprocket.

Figure 25:
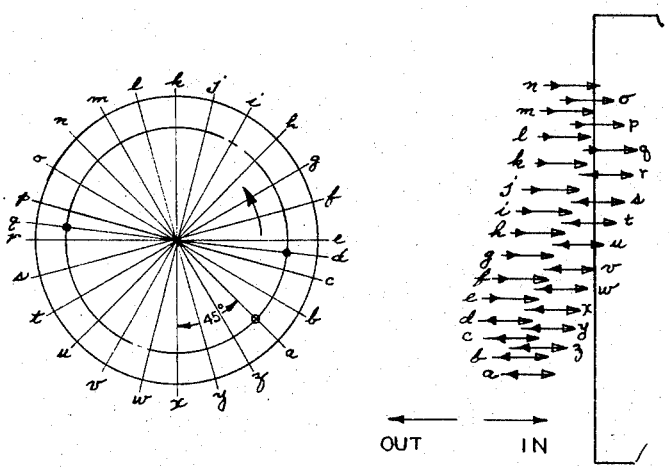

Figure 25 is a schematic drawing showing the relative position of a canhead and the can-punch as well as the direction of movement of the latter during a can-punching cycle.

Figure 5:
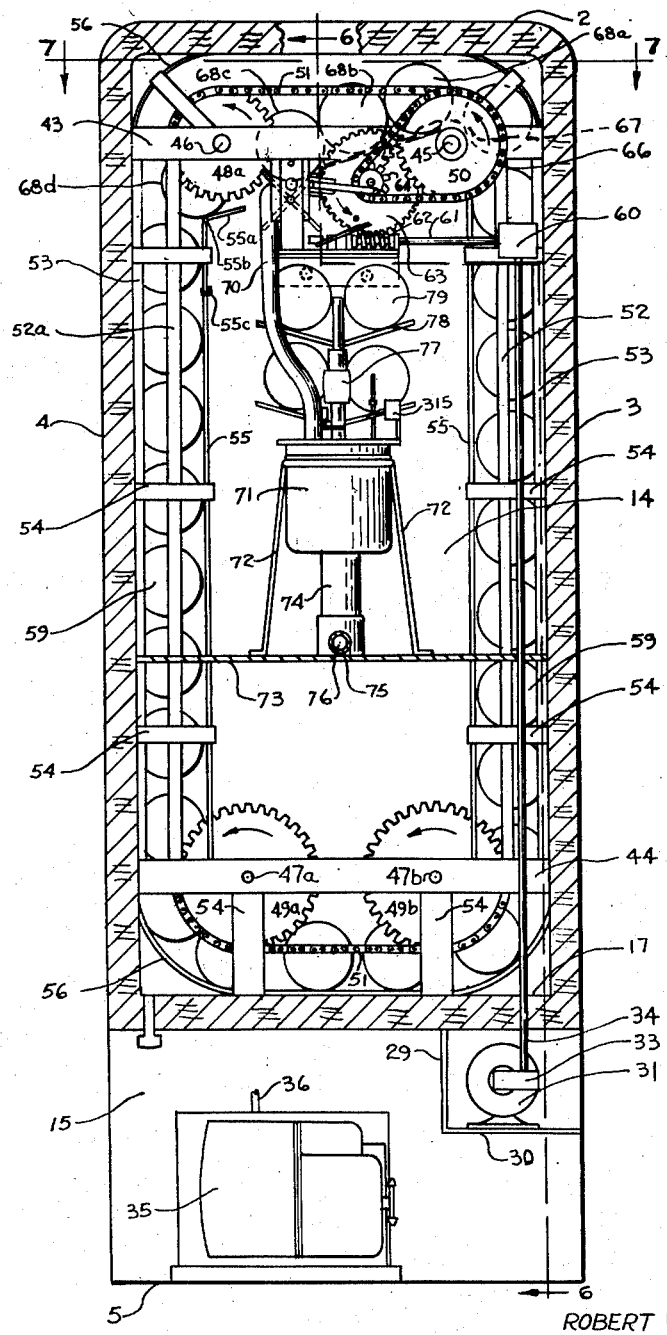
Figure 5 is a front elevation of the cabinet, partly in cross-section as taken along the line 5—5 of Figure 3, and shows the arrangement of elements within the cabinet.
Figure 8:
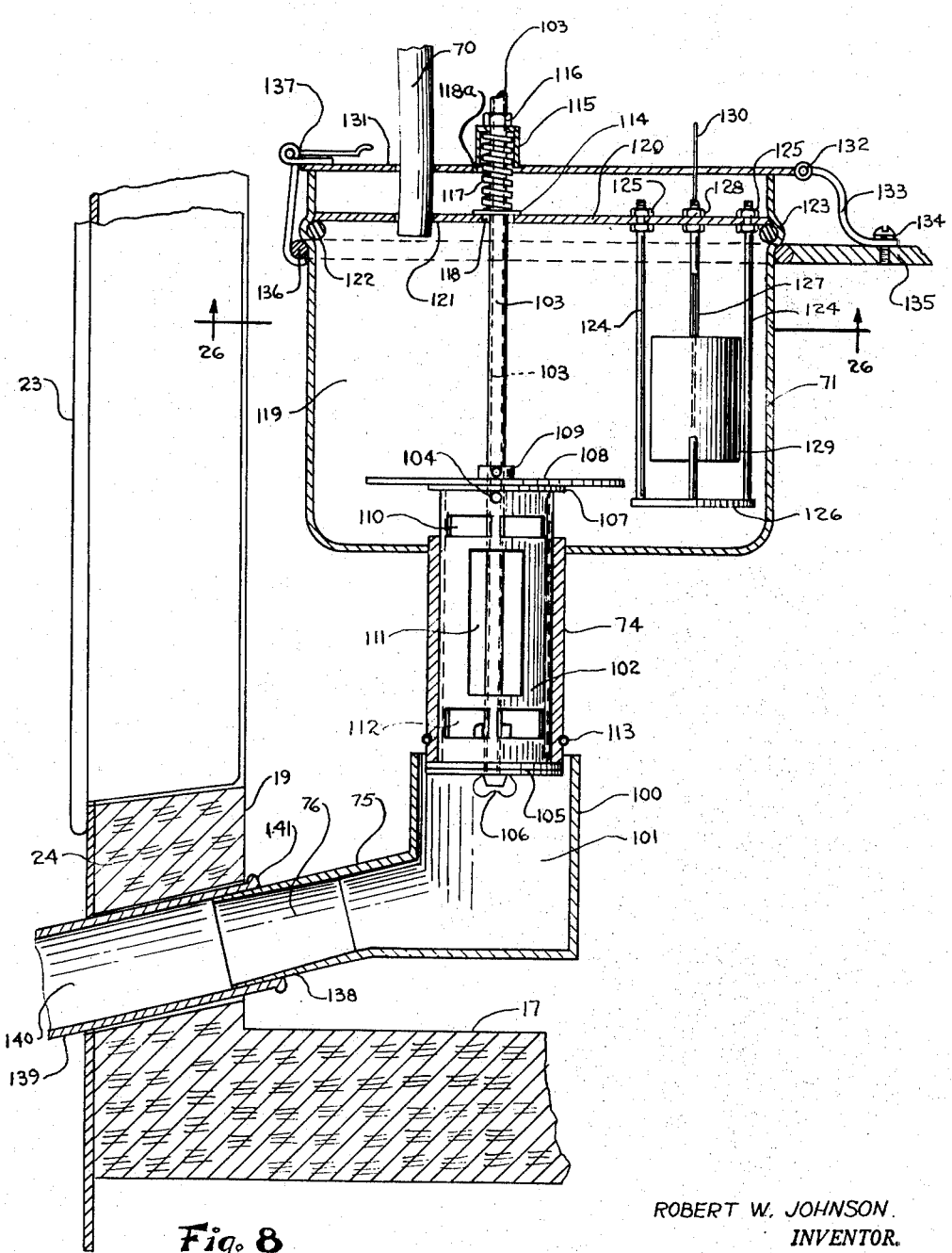
Figure 8 is a cross-sectional side elevation, in detail of a fluid reservoir, measuring valve and dispensing outlet.
Figure 26:
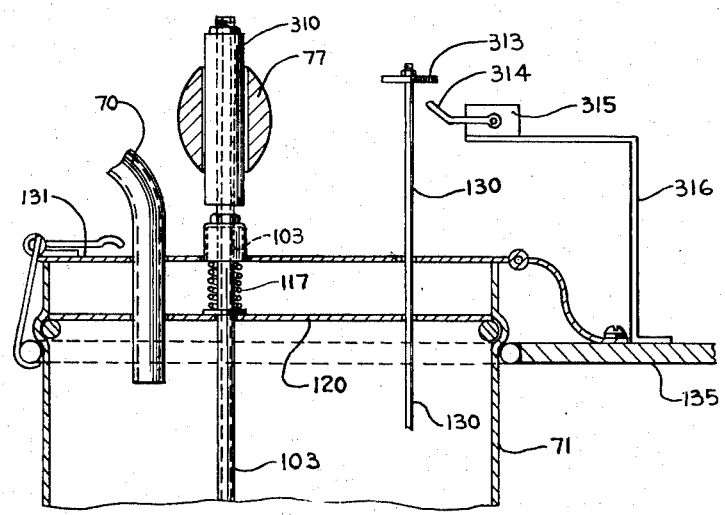

Figure 26 is a side elevation, in detail and partly in cross-section of the upper portion of the fluid reservoir with solenoid and actuating switches, not shown in Figure 8, and more clearly shown in this figure than in Figure 5.

Figure 27:
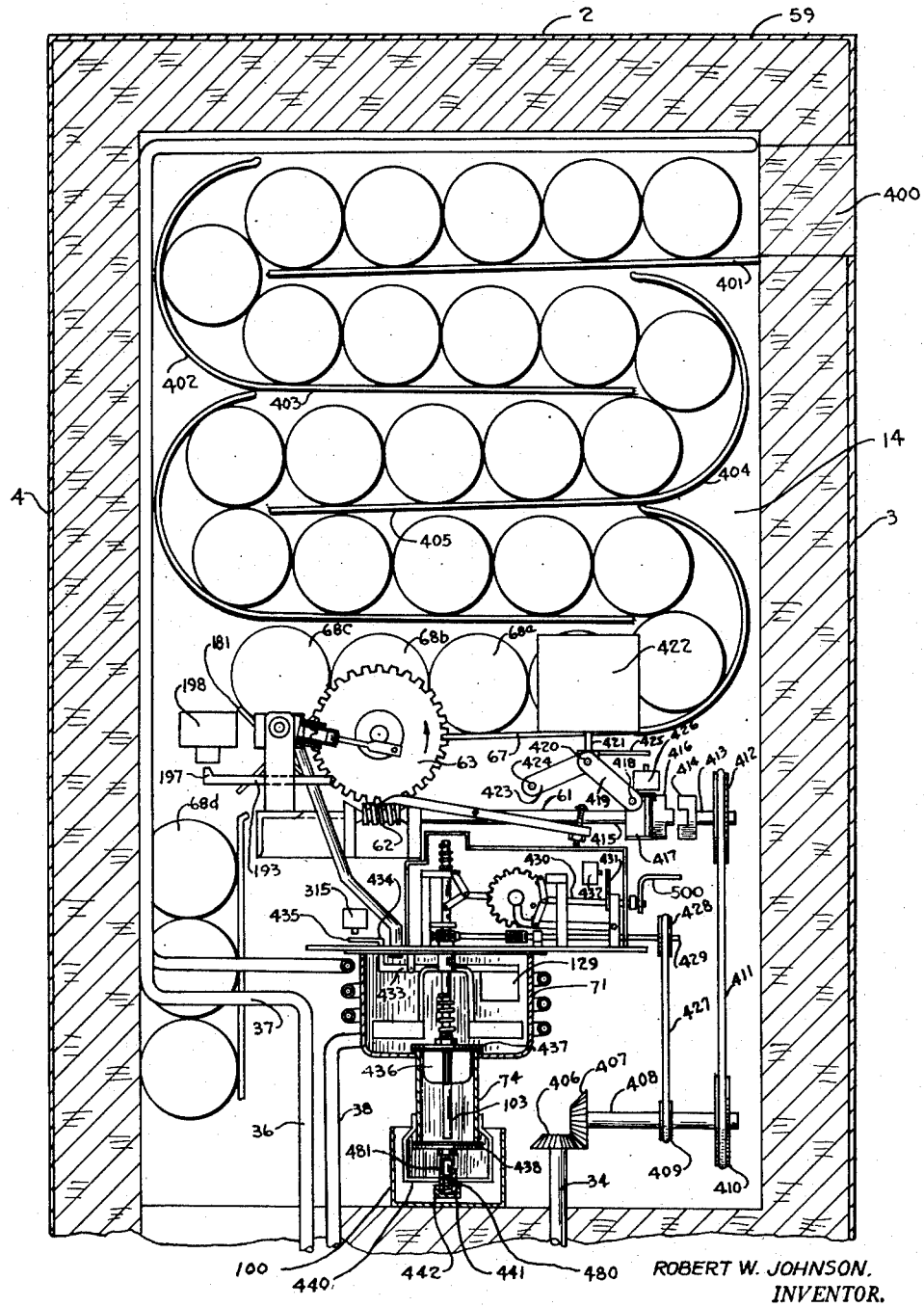

Figure 27 is a front elevation of a cabinet, somewhat similar to Figure 5 but with an alternative arrangement of working parts shown in operative assembly.

Figure 28:
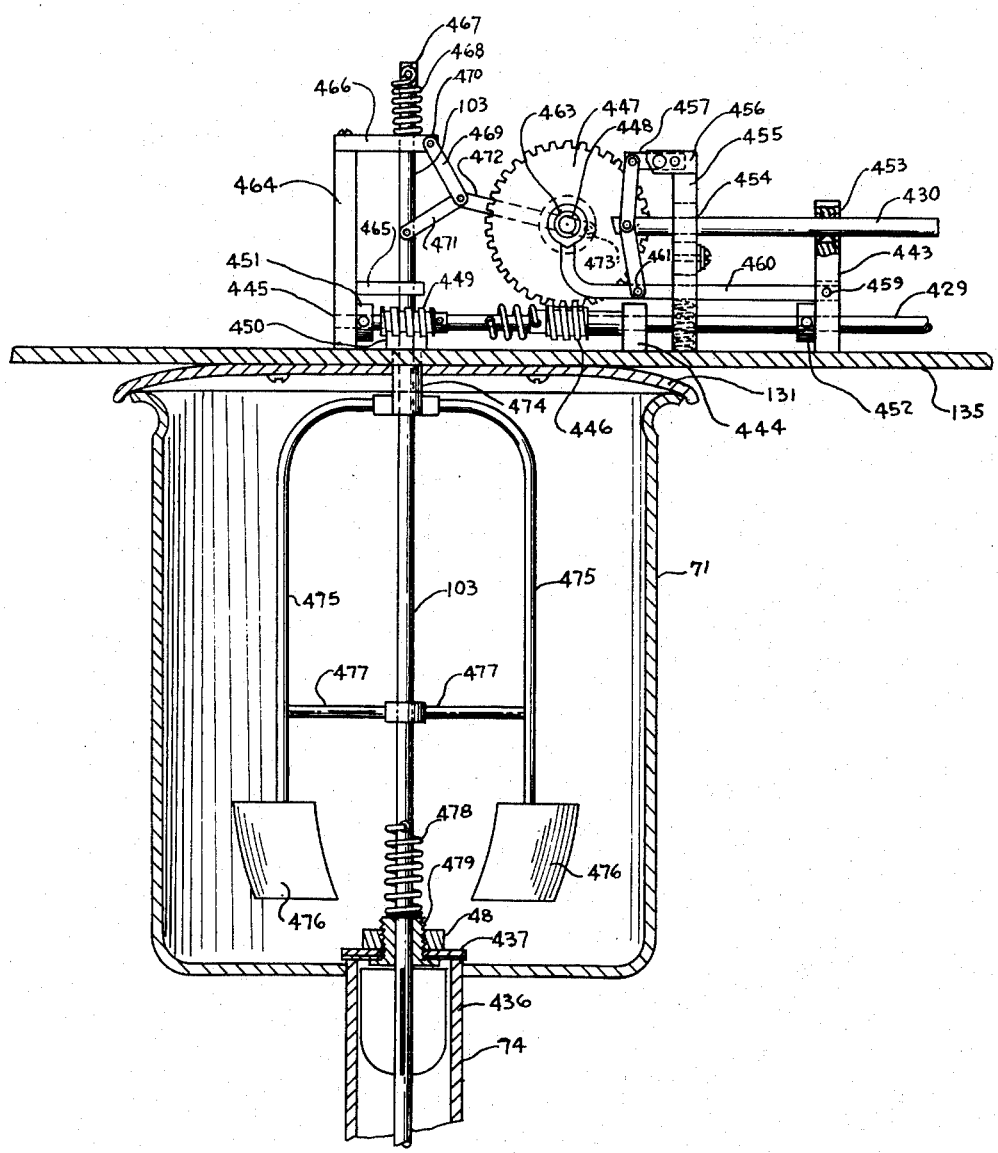

Figure 28 is a side elevation somewhat similar to Figure 8 but with the alternative arrangement of its working parts, shown in Figure 27, shown in greater detail.

Figure 29 is a detailed front elevation of a driving sprocket and gear assembly adapted to impart controlled rotation of the gear as a mechanical equivalent of the arrangement shown in Figures 10, 17, 18, 19 and 20.

Figure 30 is an elementary wiring diagram.

Figure 1:
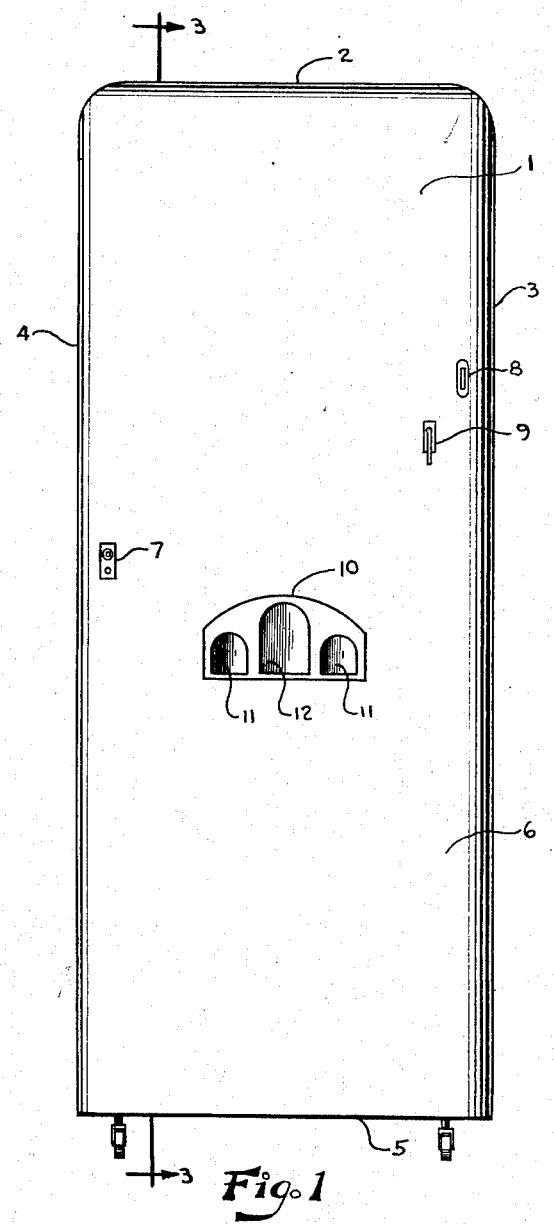
Figure 1 is a front elevation of the cabinet.

Referring now more particularly to the figures of the drawings and the several elements illustrated therein 1 represents generally a cabinet wherein I house and maintain the various operative elements of my invention. The cabinet may be of any suitable construction and dimensions, although, I prefer that it be possessed of an external shell of sheet metal decoratively covered with any suitable lacquered, enameled or painted finish. The cabinet 1 has a top 2, sides 3, and 4, bottom 5 and a hinged exterior front door 6. The hinges are not shown in Figure 1, or elsewhere in the drawings, since I prefer that they be concealed hinges of any conventional make. The hinges will preferably be located along the right-hand edge 3 of the cabinet so as to permit the door to be swung open when lock 7 is unlocked. Located at any suitable point in the door 6 is a coin slot 8 and a manual coin return lever 9 which will permit the return of coins either when making change or when the contents of the dispensing machine have become exhausted and there is nothing to dispense. Located at a convenient and accessible portion in the front door 6 is a recess generally referred to as 10 provided with one or more sub-recesses 11 and 12. The precise arrangement of the recess 10 and its component parts may be changed as desired both with regard to the aesthetic and utilitarian considerations involved. For the purposes of illustrating my invention, however, the smaller sub-recesses 11 may be utilized as a receptacle for empty paper cups which may be discharged therein and collected in a container within the interior of the cabinet; they may also be used as coin pockets into which change or returned coins are dropped upon operation of the coin operated mechanism hereafter described. In general, a somewhat larger sub-recess 12 will be provided as an access recess into which a fresh cup will be dropped and then filled with beverage after the coin operated mechanism has been set in motion by dropping a coin in slot 8.

The exterior front door 6 normally conceals, and when opened reveals, at least two smaller doors both of which are hinged to permit access into a refrigerated compartment 14, having an interior top surface 16, bottom surface 17, rear surface 18 and front surface 19. In general, this compartment is a double-walled compartment between each wall of which there is packed a suitable insulating material 24. Referring now to Figure 3 of the drawings it will be seen that the rear of the compartment is formed by the exterior rear wall 13 of the cabinet and the interior rear wall 18 of the compartment. The access doors hereabove referred to are likewise of double-wall construction with the space between the walls filled with insulating material 24. The upper door 20, suitably hinged as shown in 21 and 22, provides access to the upper portion of the refrigerated zone 14 for purposes which will hereinafter be more fully described but which in general relate to the removal of empty cans and the charging of the compartment with full cans. The lower access door 23 (likewise suitably hinged by hinges not shown) permits access to the lower portion of the compartment 14 for purposes which will hereinafter be more fully described but which in general relate to access to certain portions of the fluid reservoir for the removal, cleaning and replacement of such parts. Within the cabinet and in the lower portion thereof, below the bottom 17 of the refrigerated compartment 14, is a space which I have designated 15, adapted to house certain operative elements of my machine.

Referring now to the exterior front door 6 as shown in Figure 4 of the drawings it will be seen that the door is preferably of a recessed construction and that it possesses a front face 25, a rear peripheral face 26, rounded vertical edges 27 and an interior hollow-out face 28. I prefer that the hollow-out space provided by 28 be used to accommodate such receptacles as are necessary to store and dispense cups of paper, or equivalent material, coin receiving, collecting and returning devices, as well as whatever receptacle is provided for receiving used cups discharged through sub-recess 11. Of course, the space within 28 will also accommodate the recess 10 or its component parts if made up of a plurality of separate recesses.

Within the lower space 15 and beneath the refrigerated, insulated compartment 14 is a motor 31 suitably supported by brackets 29 and shelf 30. The drive shaft 32 of the motor extends into a suitable housing 33 wherein by means of suitable bevel gears, not shown, the rotation of the horizontal shaft 32 is translated to a vertical shaft 34 which extends upwardly and into the interior of the compartment 14. Alternatively, if desired, a pair of such motors, shafts and housings may be provided, one adjacent the front and one adjacent the rear of the cabinet interior.

Also within space 15 and desirably mounted on the floor 5 thereof is a refrigerating unit 35 which may be of the compression-expansion or any suitable type. A pair of tubes 36 and 38 are connected between cooling coils 37, located within compartment 14, and the refrigerating unit 35 to provide circulation of the refrigerating fluid and resultant refrigeration of the compartment 14. Disposed at the rear wall of space 15 is a removable screen 39, adapted when in place to provide ingress of air to dissipate the heat generated by the refrigerating unit 35 and motor 31, and adapted when removed to permit access to the motor(s) 31 for repairing or cleaning the same.

Figure 6:
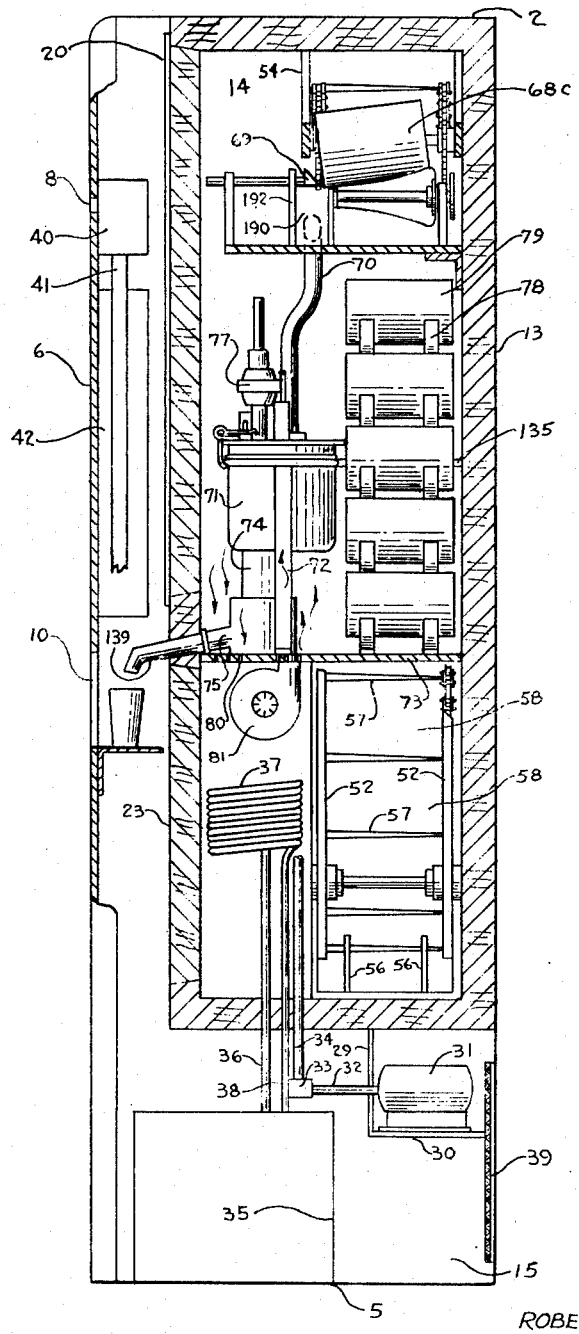
Figure 6 is a side elevation, partly in cross-section, taken along the line 6—6 of Figure 5.
Figure 7:
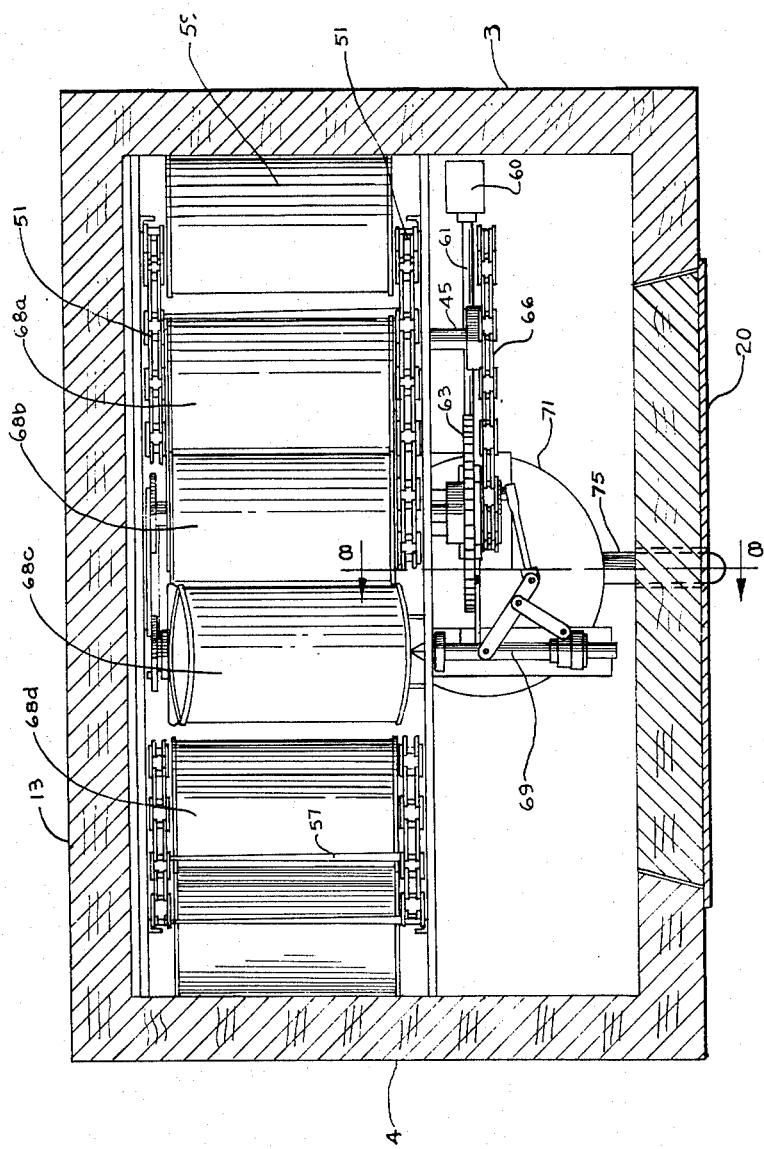
Figure 7 is a top plan view, partly in cross-section as taken along the line 7—7 of Figure 5.

Referring now to Figure 6 of the drawings it will be seen that within the space between the rear face 28 of outer door 6 and the front walls of access doors 20 and 23, I accommodate a coin-collecting and actuating assembly 40 which is positioned in operative relationship with coin slot 8. A coin or change return tube 41 depends from this assembly and leads to a suitable coin cup or sub-recess 11. This coin-collecting and actuating device is not part of my invention and I contemplate using any one of the several types now on the market. I have therefore illustrated this unit in a purely conventional manner.

Likewise I have illustrated, purely conventionally as 42 a magazine for drinking cups of paper or the like which may be discharged from the magazine and into operative position below a pouring spout in a manner heretofore well known in other types of beverage dispensing machines.

Turning now to the interior of the insulated, refrigerated compartment 14, adjacent the top thereof suitable iron or steel plates or rods 43 are horizontally placed to provide brace members and supports for the hubs of certain sprockets. Similarly disposed adjacent the bottom of the compartment 14 are corresponding plates or rods 44. If further stiffening or support is required suitable vertical plates or rods 54 may be provided between the plates 43 and 44 and the roof and floor, respectively of compartment 14. A pair of shafts or hubs 45, 46 are horizontally disposed at right angles to and supported by the upper frame plates 43 (there being one such plate at the front and one at the rear of the compartment). A similar pair of shafts or hubs 47, 47 are likewise so disposed and supported by the lower frame plates 44. Mounted near each end of right hand shaft 45 is one of a pair of sprockets 48, 48 (not shown in Figure 5 because hidden behind sprocket 50) and near each end of left hand shaft 46 is one of a similar pair of sprockets 48a, 48a. Similar sprockets, in pairs, 49a, 49a and 49b, 49b, are mounted on the lower right hand and lower left hand shafts or hubs 47a and 47b. A suitable endless link chain 51 cooperates with the teeth on each set of sprockets 48, 48a, 49a and 49b for simultaneous rotational movement of said set of sprockets.

Desirably during its vertical movement upwardly each chain 51 is confined and guided within a track 52. A similar track 52a guides each chain in its vertical downward movement, as when the chain connected sprockets are rotating in a counter-clockwise direction. These tracks 52 and 52a are desirably semi-circular in cross-section or are formed of beams having open flanged edges on each side so as to provide guide surfaces on three sides of the track with an open face presented in the direction of the opposing open face on the other track. Adjacent each track 52 and 52a is a vertical guideway 53 which desirably is formed of an angle-iron the inner flange of which cooperates with each track 52 and 52a to form the wall-end boundaries of a can pathway. Suitable horizontal plates 54 may be provided to stiffen and strengthen this can pathway. Several vertically disposed parallel rods or plates 55 are bolted, riveted or otherwise suitably fastened to the plates 54, being if desired further braced and stiffened with respect to each other with suitable horizontal ties not shown. These rods or plates 55 are spaced inwardly from the interior side walls of compartment 14 by a distance somewhat greater than the diameter of the cans, which in conjunction with guides 52 and 53 (or 52a and 53), they are adapted to restrain in the can pathway formed thereby. To permit uniform movement of the cans external curved rods or plates 56 are provided at each corner of the pathway wherein a directional change of movement of the cans in the pathway is necessary.

In spaced relation to each other and at predetermined points thereon a plurality of rungs or rods 57 are connected to each chain 51. These rungs which provide can supports are in general horizontally disposed, but for a purpose to be hereafter explained are preferably tapered, being thicker at the front or can-head end than they are at the rear or can-bottom end. The space 58 between each pair of adjacent rungs 57, 57 is adapted to accommodate a can 59 of the size for which the unit is designed.

Previously I have explained how the rotational force of motor 31 is translated to the lower end of vertical shaft 34. At its upper end, shaft 34, through the medium of a set of bevel gears located in housing 60, has its rotational force translated to horizontal shaft 61. At the outer end of shaft 61, it is operatively connected for rotation of worm gear 62, the teeth of which mesh with drive gear 63, which is mounted on horizontal shaft 64. Also mounted on shaft 64 for rotation therewith is a small pinion gear 65 which is connected by endless chain 66, for the driving of drive gear 50. Drive gear 50 is mounted on shaft 45 on which, as previously described, is mounted the pair of sprockets 48. It will thus be seen that the driving force of motor 31, acting through shaft 34, shaft 61, worm gear 62, drive gear 63, pinion gear 65, and drive gear 50, through the medium of endless chain 51 and idling sprockets 49, 49a, 49a, and 49b, causes movement of the ladder formed by chains 51 and rungs 57, thereby moving the cans 59 in the can pathway. In the embodiment illustrated in Figure 5 of the drawings, the movement of the cans in the can pathway is in a counter-clockwise direction.

Adjacent to the top of compartment 14, and at a point where the heretofore vertical movement of the cans in the can pathway has been changed to horizontal movement, the inner guide bars or rods 55 are directionally changed to provide downwardly sloping tracks 67. As the cans 59 reach this track they tend, by gravity, to drop from the spaces 58 between the rungs 57, and as progressively shown by reference numbers 68a, 68b, and 68c, are transferred down the inclined surface 67 until they reach the opening, cutting, puncturing or can-punching position indicated at 68c. After a can has been cut open or apertured as by the punch designated generally as 69, and its contents permitted to drain to and through the tubular conduit or pipe 70, the empty can is permitted to drop onto lip 55a as shown in position 68d, whence it will fall by gravity into the can pathway and will assume a position within the space 58 between two adjacent rungs 57 of the ladder. The opener, punch or puncturing means 69 includes a cutter, blade or head 177 later described.

The fluid which has entered conduit 70 drains into a fluid reservoir dispensing vessel, pan or the like 71 which, through the medium of suitable brace members or supports 72 is held in position above a suitable ledge or support 73. Disposed below reservoir 71 is a valve housing 74, at the lower end of which a tubular conduit 75 having an interior bore 76 is adapted for conveying fluid to a dispensing spout. In the modification shown in Figure 5 of my drawings mounted above reservoir 71 is a solenoid 77, the purposes and parts of which will be described in detail hereinafter. Disposed within a suitable free space within compartment 14 I may provide an arrangement which I term a "hat rack" 78 for the purpose of supporting and storing a number of cans over and above that number which will be accommodated within the can pathway, so as to gain the advantage of pre-cooling such cans 79. Desirably, I may also provide perforations or vent holes 80 through support 73 and suspend from support 73 a suitable air fan or blower 81. Such an arrangement, particularly where the blower 81 is located adjacent to the cooling coils 37, will augment the circulation of cold air and provide a more uniform degree of refrigeration in the upper part of compartment 14.

Turning now to Figure 8 of the drawings, it will be seen that reservoir 71 is generally bowl-shaped or pan-like and that depending from the bottom therefrom and through a suitable opening therein is valve-housing 74. At its upper end housing 74 is sealed into the bottom of reservoir 71 so as to provide a leak-proof joint. At its lower end housing 74 depends over and into an enlarged vertical catch basin 100, the interior, 101, of which communicates with passage 76 of conduit 75.

Disposed within the cylindrical valve-housing 74, and of a size to provide a snug yet relatively frictionless fit therein, is a perforated cylinder 102. Substantially co-axial with the vertical axis of the cylinder 102 is a vertical rod 103, preferably tubular, the extreme upper end of which is open to the atmosphere. For sealing off the bottom of cylinder 102 I provide a flat disc-plate 105 which is held firmly in place, yet removably so, by wing-nut 106 which is threaded onto the bottom end of rod 103. This plate 105 is preferably circular in shape and large enough to overlap the bottom edges of housing 74 thereby functioning not only as a bottom for cylinder 102 but as a stop to limit upward movement of cylinder 102. A similar disc-plate 107, of corresponding size and dimensions, is mounted on the top edge of cylinder 102, likewise both to seal off the top thereof and to serve as a stop to limit downward movement of the cylinder when in contact with the top edge of housing 74. An air vent 104 in rod 103 is provided to prevent air compression when the cylinder 102 is lowered and to prevent air-lock when the cylinder is being emptied. Surmounting plate 107 is a plate or disc 108 of larger size held in place by a pin and collar 109. This disc 108 is designed to agitate the fluid contents of reservoir 71 when moved upwardly or downwardly in cooperation with rod 103 and cylinder 102. If desired disc 108 may be perforated and in lieu of a single disc two or more may be attached to tube 104 in spaced relation to each other.

Cylinder 102 is perforated with a plurality of ports 110, 111 and 112. When the cylinder is in its uppermost position, that is when stopped by disc 105, ports 110 are disposed above the top marginal edge of housing 74 so as to provide fluid passageways between fluid within reservoir 71 and the space within cylinder 102. Downward movement of cylinder 102 closes off the ports 110 and seals off the interior of 71 from the interior of 102. Ports 112 are normally sealed by the interior wall of housing 74 when cylinder 102 is in elevated position but lowering the ports 112 below the bottom edge of housing 74, opens these ports and permits the fluid contents of cylinder 102 to drain into catch basin 100. The distance between upper ports 110 and lower ports 112 is so related to the length of housing 74 that one set of ports is always sealed off. Ports 111 are provided to lighten cylinder 102 by eliminating excess weight and to permit cylinder 102 to be more readily cleaned and sterilized when removed for that purpose. Ports 111 are always sealed by the wall of housing 74. To minimize splashing where fluid is drained into catch basin 100, I desirably provide an annular bead 113 around the lower wall of housing 74, placing this bead low enough to serve the purpose for which it is intended but high enough to clear and leave an air vent between the lower edge of housing 74 and the upper edge of catch basin 100.

Examining the upper portion of reservoir 71 it will be seen that tube 104 terminates at its upper end and rests against a washer 114 which encircles rod 103. Above washer 114 and below a cap 115, held in place by nut 116, is a spring 117. Nut 116 is threaded upon rod 103. A splash plate 120, provided with a recess 118 therethrough to accommodate the upper end of tube 104 and a recess 121 therethrough to accommodate the lower end of drainage tube 70, is disposed horizontally, entirely across the interior of reservoir 71. Plate 120 rests upon an annular bead or gasket 122 which is housed within and supported by a cooperating annular bead 123 on the surface of reservoir 71. Offset from the portion of the interior of reservoir 71, occupied by rod 103 and the elements associated therewith, are vertical supports 124 bolted to plate 120 by bolts 125 at their upper ends. At the lower ends of supports 124 they are affixed to an annular horizontal plate 126. A vertical tube 127 is substantially centrally located both with respect to the supports 124 and the bottom plate 125 and is likewise bolted on to plate 120 by threaded nut 128. A float 129 is slidably mounted on tube 127 and is attached to a rod 130 which is housed within tube 127 so that upward or downward movement of float 129 in response to the fluid level within reservoir 71 is imparted to vertical rod 130.

A hinged horizontal cover plate 131 is mounted above splash plate 120 and is supported at one side thereof by hinges 132 connected to hinge arm 133 which is bolted or otherwise affixed at 134 to a supporting arm or ledge 135. Encircling the outer periphery of reservoir 71, at a point which is below annular bead 123, is an annular ring 136 which serves not only to help sustain reservoir 71 in position but also, at a suitable point on its periphery, to serve as a latch for spring latch 137.

At its outer and discharge end, tube 75 is beveled as shown at 138 in order to provide a fairly snug interior fit within the bore 140 of tube 139 which leads through the front wall of refrigerated compartment 14. The interior end of tube 139 is preferably beaded at 141 to provide a strengthening flange and to facilitate insertion of tapered end 138 of tube 75.

Figure 9:
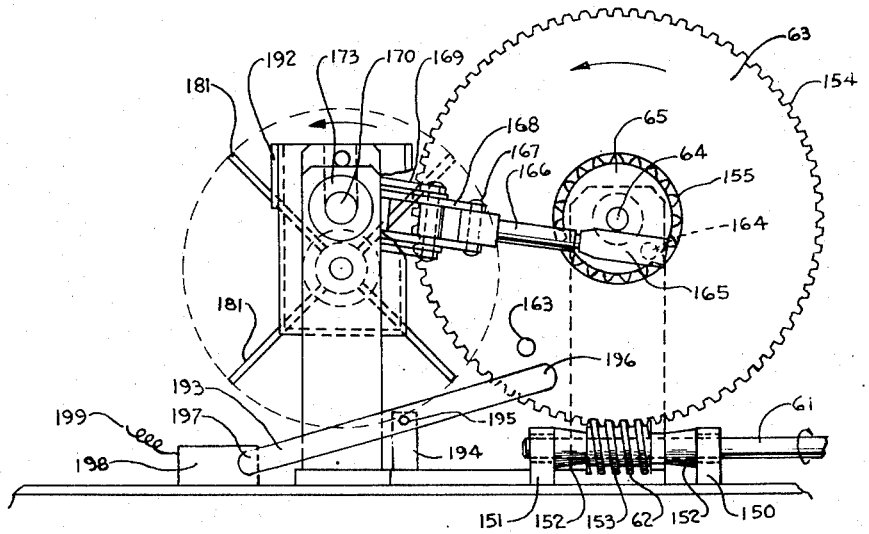
Figure 9 is a detail, side elevation of an arrangement of elements for moving cans on a track and for moving a selected can into can punching position.

Referring now to Figure 9, horizontal shaft 61 is supported at one end by a pair of bearing blocks 150 and 151 between which is disposed worm gear 62 which is held in place by conical thrust collars 152, 152 which are mounted on shaft 61. The teeth 153 of worm gear 62 mesh with the teeth 154 of drive gear 63. Mounted eccentrically on the exterior face of drive gear 63 is a lug 163. As heretofore stated drive gear 63 is mounted on shaft 64 and is keyed therewith for rotation therewith. Also mounted on shaft 64 is the pinion gear 65 which is separated from drive gear 63 by an annular spacing plate 160. Pinion gear 65 is provided with teeth 155 which mesh with and drive endless chain 66.

Also mounted on shaft 64, keyed therewith for rotation therewith, and disposed adjacent to outer face of pinion gear 65, is an annular plate 161 into which at a desired point adjacent its periphery is inserted a pin 162 having a rounded universal knob or outer end 164 which is adapted to be inserted within a co-acting recess in crank arm 165. Threaded into the opposite end of crank arm 165 is a connecting rod 166 which by a suitable clevis and pin arrangement is connected with a pair of toggle arms 168. Connected to toggle arms 168 at a point intermediate the ends thereof is another pair of toggle arms 169. At the upper end of toggle arms 168 they are connected by a pin with shaft 170. Toggle arms 169 at their upper ends are connected with a collar 171 which is mounted on sleeve 172 by means of a suitable pin. Adjacent collar 171, and restraining sleeve 172 by means of the enlarged outer flange thereof, is a fixed supporting bearing 173 for sleeve 172 and shaft 170 is held thereby. Collar 171, sleeve 172 and bearing 173 coact to provide a fixed pivotal point for toggle 169. A shaft bearing 174 is provided adjacent the opposite end of shaft 170. Toggles 168 and 169 permit reciprocating yet controlled movement of shaft 170. Within a central bore 175 located at the forward end of shaft 170 provision is made for the threaded insertion of a threaded rod 176 to the outer end of which is threaded a cutter blade or head 177 constituting herein the can wall piercing element of the can opening, aperturing, punching, puncturing or cutting means previously mentioned and referred to generally as 69.

Shaft 170 is disposed with its major axis substantially in a horizontal plane. Opposite the cutter head 177 on shaft 170, and with its major axis in substantially the same vertical plane as that of shaft 170, but disposed somewhat below the horizontal plane of shaft 170, is an additional shaft 180 supported on bearings 178 and 178a. A set of four can spacing fins or spiders 181 are mounted at each end thereof on a pair of collars 183 which are concentric with shaft 180 and mounted thereon. These fins are generally disposed at right angles to the adjacent of each other and are so constructed that the ends 182 thereof nearest cutter head 177 are considerably smaller than the opposite ends 184, the outer peripheral edges of the fins being tapered from 184 to 182. Disposed between bearing 178a and the ends 184 of the shaft 180 is a collar which is both keyed to shaft 180 for rotation therewith and keyed into the adjacent bearing 183 to cause it and its supported fins 181 to rotate.

Mounted on shaft 180 at the end furthest removed from cutter head 177 is a can-positioning cam 204. Disposed beneath cutter head 177 is a catch basin 190 at the bottom or lower side of which is connected tube 70. Vertical walls 192 of catch basin 190 extend above shaft 170 and cutter head 177 on most of three sides thereof to provide splash boards and to catch fluid discharged from a freshly opened can. To provide a stop for a can head the forward edges of sides 192 are beaded and reinforced as shown at 191. Disposed in an inclined plane with the lower end at a level substantially the same as that of the top edge of the front wall of catch basin 190 is a can track 185 which is supported on a suitable frame 158 on which also are mounted bearings 156 and 157 for shaft 64. At the outer enlarged end of can spacing fins 181 a corresponding track 186 is likewise in an inclined plane. Disposed between shaft 64 and 180 on the one pair of sides and between tracks 185 and 186 on the other pair of sides is a space 187, the dimensions of which are somewhat smaller than that of a can.

Mounted adjacent bearing 151 at the outer end of shaft 61 is a pedestal 194 which supports a rocker arm 193 by means of a pin located at about the fulcrum or middle of rocker arm 193. One end of rocker arm 193 is prolonged to a position 196 where it is adapted to contact pin 163 on drive gear 63. The opposite end 197 of rocker arm 193 is adapted to contact, when in proper position, micro-switch 198 which is energized by suitable electrical connections 199.

Referring now to Figures 10 and 11, can-positioning cam 204, as mentioned above, is mounted on one end of shaft 180. Mounted on one end of shaft 64 is a can-driving cam 200 which is disposed within substantially the same vertical plane as that of cam 204. By means of a pin 201 located adjacent the periphery of cam 200 a crank 202 is connected with cam 200. Threaded into crank 202 is a rod 203, at the outer end of which there is provided a latch 209 having on the under edge thereof a recess 210. Mounted on can-positioning cam 204 and on the outer face thereof are four pins 205, 206, 207, and 208. These pins are disposed on the periphery of a circle somewhat smaller than the periphery of cam 204; they are also disposed on radii of a circle concentric with shaft 180 each of such radii being substantially 90° apart. In general, the pins will be located opposite the major vertical axis of each of the can spacing fins 181. At points intermediate pins 205, 206, 207, 208, respectively and on the outer periphery of cam 204 are four notches 212, 213, 214, and 215. These notches are likewise disposed at the ends of radii of the circle concentric with shaft 180 and are respectively 90° apart from each other.

The major portion of the outer periphery of cam 200 is represented by a circle concentric with shaft 64. At predetermined points 216 and 217 cam 200 is machined away to provide a desired cam surface. Mounted on a pedestal 218 at the upper end of which there is a pin 219 is a lever arm or cam latch 220. One end of latch 220 has an upwardly-extending shoulder 221 adapted to cooperate with edges 216 and 217 and the cam surface of cam 200. The opposite end of latch 220 is an upwardly-extending shoulder 222, of a size and shape adapted to fit in each of notches 212, 213, 214, and 215 on cam 204. A spring 223 is connected at one end with pin 219 and at its opposite end with a pin driven through shaft 203.

The foregoing description completes the elemental discussion of the mechanical features of one embodiment of my invention as these features pertain to automatically operated and correlated structure for moving or transferring cans in the can pathway, moving or transferring a selected full can into can-punching position, punching the can and collecting the fluid contents drained therefrom.

Figure 13:
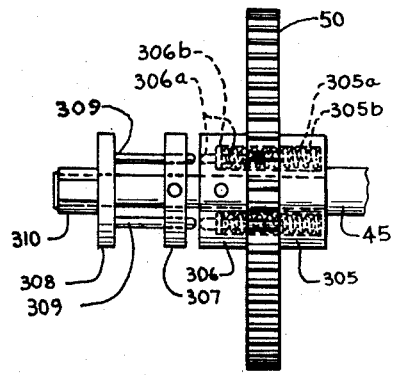
Figure 13 is a side view of the sprocket and clutch shown in Figure 12.

I have found it desirable, when charging the can pathway with full cans and removing the empty cans, to provide structure which will permit rotation of the idling gears 48, 48a, 49a and 49b together with chain 51 without moving gear 50 and the related elements which comprise the can-moving and can-punching mechanism. I may accomplish this by mounting gear 50 on shaft 45 so as to permit gear 50 to rotate independently of shaft 45 under some conditions. I provide a freely rotated collar or hub 305 which is pinned to or integral with gear 50 and rotates simultaneously therewith. A similar collar or hub 306 is disposed adjacent to the outer face of gear 50 and is pinned or otherwise suitably affixed to shaft 45 for rotation therewith but independently of gear 50 and corresponding hub 305. Disposed adjacent to the outer face of hub 306 and fixedly mounted on shaft 45 for rotation therewith is a collar or plate 307. Another collar or plate 308 is disposed in a predetermined position and distance from the outer face of collar 307. On the outer face of plate 308 is a hexagonal fitting 310 adapted to be accommodated within a suitable recess in a conventional crank handle (not shown). Plate 308 and fitting 310 are welded or pinned together and therefore rotatable as an integral unit, both elements being free to rotate independently of rotation of shaft 45 and both having interior bores sufficiently larger than the diameter of shaft 45 to permit reciprocating movement along the shaft. From the inner face of plate 308 project a plurality of pins 309 which extend approximately parallel to the major axis of shaft 45 and which likewise extend into and through a plurality of bores drilled through plate 307. I also provide a plurality of bores or taps 305a which extend through collar 306, gear 50 and partially through collar 305. These bores 305a are, for the major portion of their length, of somewhat larger diameter than the pins 309, and are large enough to retain suitable compression springs 305b. These bores are spaced apart from each other the same distance as the pins 309 are spaced from each other. Adjacent the outer face of collar 306 the bores 305a are reduced in diameter to a size just large enough to accommodate one of the pins 309. Suitable pins 306a are provided with collars 306b and inserted into the bores 305a to hold the springs 305b under compression. In their normal position the pins are shown as in Figure 13 with their shanks extending across the adjacent boundary walls of gear 50 and fixed collar 306. In this position rotation of shaft 45 imparts rotation to collar 306 and through the medium of the pins 309, gear 50 (and collar 305) are simultaneously rotated. When a crank is placed on hexagonal fitting 310 and rotated with an inward pressure plate 308 rotates and consequently pins 309 move against the outer face of collar 306 until the pins are opposite the bores 305a. Further inward pressure forces pins 309 into the bores and consequently forces pins 306a against the compression of the springs until the tips of the pins 306a have passed entirely within gear 50. When this condition is reached rotation of the crank will rotate plate 208, plate 307, and collar 306, which, being fixed to shaft 45, will rotate the shaft; however, the pins 306a having being depressed within gear 50, this gear and its collar 305 will not rotate, particularly against the friction of chain 66. Consequently shaft 45 and idling gears 48, 48a, 49a and 49b may be rotated in either direction without imparting movement to chain 66 and the operative elements associated therewith.

Turning now to Figure 26 of the drawings, there is illustrated therein that portion of the elements of my invention not shown on Figure 8 and only shown in outline on Figure 5. Mounted on shafts 103 and preferably on tube 104, which surrounds it, or a similar tube which extends above reservoir top 131, is the solenoid 77 previously mentioned, sometimes herein referred to as the dispensing solenoid and so marked on the diagram Fig. 30. Within solenoid 77 is a solenoid core 310 which is free to reciprocate upwardly and downwardly in response to energizing or de-energizing the windings of solenoid 77. As heretofore described, rod 130 was connected to float 129 for vertical reciprocating movement in response to the movement of the float. At the upper end of rod 130, and exteriorly of reservoir 71, there is provided a contact plate 313, which, at a suitable point presses upon switch arm 314 of micro-switch 315. Micro-switch 315 is suitably supported by any type of bracket or support 316 so as to be in operative position.

I shall refer now, briefly, to the diagram shown as Figure 25 the details of which will be described hereinafter with regard to the operations of the can-punching mechanism. The circular figure on the left side of Figure 25 represents diagrammatically the face of plate 161 and the smaller circle within the outer one represents the path traveled, during a cycle of 360°, by pin 162. The radial lines marked with the letters of the alphabet represent various points on the path traveled by pin 162 in making a cycle. The right-hand figure of Figure 25 represents diagrammatically a can head and the open arrows represent diagrammatically the position of shaft 170 and cutter head 177 with respect to the can head. The solid arrows indicate the direction of movement of shaft 170 and its associated cutter head 177. The letters adjacent each arrow represent the co-relation of the cutter head position with respect to the positions of pin 162 on the circular figures of Figure 25.

In Figure 30, I have illustrated with legends an elementary wiring diagram showing the various circuits which I may use particularly with reference to the modification shown in Figure 5 of the drawings. In general, I prefer to utilize a standard 110 volt alternating current as the source of my electrical power. That portion of the diagram represented on Figure 30 below and including the line containing the dispensing solenoid 77 shows diagrammatically the several switches which I have illustrated elsewhere in my drawings as being associated with and controlling the several elements such as the solenoid, the can-advancing mechanism, the can-punching mechanism, the float, and the main driving motor 31.

The portions of the diagram on Figure 30 which appear above those just referred to represent the various types of controls, signals, switches and associated parts which in general will be supplied as parts of the coil controlled unit which I contemplate purchasing and utilizing as available. This part of the diagram is illustrative only and the parts and circuits will vary depending upon the type of coin operative controls, change making devices, etc. utilized by the manufacture of such units.

In Figure 27 of my drawings I have illustrated a somewhat different modification of my invention. The view of this figure of my drawing is patterned after the view of a different modification shown in Figure 5. Certain elements in Figure 27 are identical with the corresponding elements shown in Figure 5 and have been given the same reference numbers.

Within the upper portion of the interior refrigerated compartment 14, I provide a removable access port 400 of a size large enough to permit the insertion therethrough of a suitable can 59. Cans inserted through port 400 are placed on the upper end of an inclined track 401 where, through the force of gravity, they are permitted to roll down and onto a return bend 402 of a similar track 403 and thence onto a return bend 404 of a similar track 405, and so on, until they roll down and onto a track otherwise similar to 67. From this point the cans assume the positions 68a, 68b, and 68c, similar to those on Figure 5 of the drawing and after discharge assume a position similar to 68d.

A vertical shaft 34, connected to a motor 31, not shown, terminates in one of a pair of bevel gears 406 and 407, the latter being connected to a suitable horizontal shaft 408 on which are mounted two pulleys 409 and 410. Pulley 410 is connected by belt 411 to pulley 412, which is mounted on a horizontal shaft 413. Fixably mounted on shaft 413 for rotation therewith is a recessed clutch plate 414. Mounted opposite clutch plate 414 on shaft 415 is a co-acting clutch 416 which is keyed to shaft 415 for rotation therewith. Also mounted on shaft 415 is a thrust collar 417, which, by a suitable clevis pin 418 is connected to a toggle 419. The opposite end of toggle 419 is mounted on a clevis pin 420 which is connected with a rod 421, which in turn is connected with the core, not shown, of a solenoid 422. Also connected to clevis pin 420 is another toggle arm 423, the opposite end of which is rotatably, but otherwise fixedly, connected to a pin 424. Mounted on rod 421 is a switch arm 425 adapted for a make-or-break contact with micro-switch 426.

Pulley 409 is connected by means of belt 427, to pulley 428 mounted on shaft 429. The elements associated with shaft 429 and its rotation are shown in greater detail in Figure 28 of my drawings and will be described with relation thereto with certain exceptions noted hereafter. Float 129 is connected to a lever arm 433 which has a vertical extension 434 terminating in a horizontal switch arm 435 for make-and-break contact with micro-switch 315.

Within valve housing 74 and mounted on vertical tube 104, is a valve 436, provided with a cover plate 437 which overlaps the top marginal edge of housing 74. At the bottom edge of valve housing 74, a plate 438 is located concentric with the vertical axis of rod 103. Plate 438 overlaps and seals the bottom edge of housing 74 but is adapted to be depressed by rod 103. Depending from, and rigidly attached to housing 74 is a basket frame 440, the bottom of which supports an inverted cap 442, which is interiorly threaded for connection with a tubular sleeve 441. Within the recess formed by sleeve 441 and cap 442 is a compression spring 480. At its lower end spring 480 bears against cap 442 and at its upper end it bears against the bottom of a pin 481 which threadedly engages and supports plate 438.

Turning now to Figure 28, shaft 429 is supported at one place by a bearing in pedestal 443, and is further supported by bearings 444 and 445. Mounted on shaft 429 is worm gear 446, the teeth of which are adapted to co-act with gear 447, which is mounted on shaft 448. Mounted on further end of shaft 429 is another worm gear 449, the teeth of which are adapted to co-act with a horizontally rotatable gear 450, mounted on tube 104. Suitable collars 451 and 452 are provided on shaft 429 to eliminate horizontal movement thereof.

Pedestal 443 has a bushing 453 therein and through a similar bushing 454 in pedestal 455, shaft 430 is designed to reciprocate in a horizontal direction but its movement rotationally or otherwise is restrained. Supported by an arm 456 which extends horizontally from pedestal 455, is a toggle 457 the outer end of which is connected with another toggle 458. Pivotally connected at 459 is an arm 460 to which is connected toggle 461, the upper end of which is connected with toggle 458 and shaft 430 by means of a pin 462. Arm 460 has, at the end remote from its pivot a vertical extension to which are connected bearings 463 which support shaft 448 and in turn support gear 447. Pedestal 464, which houses bearing 445 has intermediate its ends, a horizontal arm 465 and, at its upper end, a horizontal arm 466, each provided with bores therethrough to furnish vertical guides and bearings for vertical rod 103. Mounted above the uppermost arm 466 and restrained between a pin 467 and the arm 466, is a spring 468 which surrounds rod 103. At the extremity of arm 466 furthest from pedestal 464 is a toggle 469 connected by a suitable clevis pin 470. Connected with toggle 469 is another toggle 471 which, at one end, is connected to rod 103 by means of a suitable clevis pin. The adjoining ends of toggle 469 and 471 are connected by a clevis pin with a crank rod 472 which is mounted on a crank pin 473 which is on the face of but eccentric from gear 447.

Within the reservoir 71 and supported by a suitable bushing 474 which is keyed to or fastened to gear 450 and which is concentric with shaft 103 are two or more brackets 475, at the lower ends of which are affixed suitable agitating paddles 476. Brackets 475 may be stiffened and strengthened by suitable cross braces 477 and the whole assembly of supports and paddles is adapted to rotate with the rotation of gear 450. Spring 478, attached at its upper end to rod 103 and at its lower end bearing upon a threaded bushing 479, surrounds rod 103 toward the bottom of reservoir 71. Bushing 479 is held in place by a threaded nut 480 between which and the head of the bushing valve cap 437 is held in place.

Referring to Fig. 29, as a further modification of the arrangement shown in Figures 10, 17, 18, 19 and 20 for imparting controlled rotation to the can moving cams I may utilize, in lieu of the cams, and mounted on shafts 64 and 180 respectively, a pinion gear 300 and a driven gear 303; the teeth 301, or pinion gear 300, co-act with the teeth 302 of driven gear 303. These two gears are of such size and possess such pitch of their teeth as to cause one quarter of a revolution of gear 303 for each complete revolution of pinion gear 300.

MODE OF OPERATION AND MANNER OF USE

*a. General principles*

Certain elements of my apparatus are old and well understood. For example there are on the market, and available for purchase, certain devices with their attendant electrical circuits and connections which are actuated when a coin of selected denomination is dropped into a receptacle therefor. Some of such devices have further refinements, such as means for rejecting slugs or counterfeit coins. Other devices permit the insertion of coins of different denominations and deposit the correct change in a change-return cup, meanwhile withholding and utilizing for actuating the dispensing elements a coin of the proper denomination. Still other devices reject the deposited coin when change cannot correctly be made or, when due to mechanical breakdown or exhaustion of the product to be dispensed, the apparatus is temporarily non-operational. None of such devices or refinements thereof is part of my present invention, yet I may utilize any or all of them.

My invention is in one of its aspects an improvement on a device which utilizes a well-known principle of energizing a primary electrical circuit by depositing a coin in an actuating device. My improvement as to means and manner of utilizing the energized electrical circuit I believe to be new and original with me and my foregoing recognition of certain prior art devices is not to be construed as any admission on my part of lack of invention in the combination of parts which I have invented.

*b. The loading operations*

An operator desiring to load or charge my apparatus with a complement of cans need only unlock and open outer door 6 and then access door 20. Of course, a supply of cups may be placed in magazine 42, and coins removed from or change placed in coin box 40 in any well-known manner. At some suitable part of the can-pathway an access port leading thereinto is provided. Thus part of the vertical guide 55 may be hinged as at 55b so as to swing inwardly when desired, yet latched as at 55c when access to the can-pathway is not desired. A can may be placed in the can-pathway through this port and permitted to rest on the lower of two adjacent rungs 57. Chains 51 may be manually moved a desired distance in a counter-clockwise direction by means of a crank fitted on head 310, turned so as to turn gear 50, shaft 45 and idling gears 47 which move chains 51. Desired movement of chains 51 having been effected so as to lower the first can into the can-pathway a sufficient distance below the access port additional cans are likewise and successively added until the can-pathway has a complete complement of filled cans.

If my device has previously been in operation, emptied cans may be successively removed from the can-pathway to furnish space for full cans and desirably the first increments of cans loaded into the can-pathway will be precooled cans 79 removed from the support or "hat-rack" 78. After the can-pathway has been fully loaded, additional cans may be placed on the "hat-rack" 78 for precooling the same.

As a step which may well coincide with the loading operations, parts 70, 192, 139, 75 and 100, all being conduits or parts of conduits which have been exposed to direct contact with the fluid may be easily removed, washed or sterilized and then replaced. With the same frequency or less frequently, if desired, reservoir 71, housing 74, cylinder 102 and associated parts may be readily removed, cleaned or sterilized and reinserted in place. All such steps may be taken in a brief time.

Customarily the foregoing operations will all be conducted with the master switch on the primary electrical circuit in "off" or de-energizing position. Upon completing the foregoing steps, the switch will be turned "on" thus energizing the refrigerating unit 35 and the blower 81, both of which desirably will have thermostatic controls, to refrigerate the interior of compartment 14 and cans housed therein.

*c. Automatic operation*

Assuming that the can-pathway has been fully loaded with full cans and the master switch controlling the refrigerating coils and blower has been placed in operative position and assuming further that reservoir 71 is nearly or completely empty of fluid, the following described series of operations will result automatically. Because of the absence of fluid in reservoir 71, float 129 will be adjacent its lowermost position. Rod 130 will be pulled downwardly and contact arm 313 will be in contact with switch arm 314 of micro-switch 315. The closing of micro-switch 315 will through the can opener motor starter relay, Fig. 30, energize the primary power circuit causing motor 31 to rotate. The rotation of motor 31 will rotate shaft 61, worm gear 62, drive gear 63, shaft 64 and cam 200. Movement of cam 200 through a complete cycle will impart a one-quarter revolution to cam 204. This will rotate shaft 180 and move the can fins 181 through a 90° arc of a circle. Can 68b will be picked up and cradled between two of the fins 181 and carried to the position 68c. At this point the locking elements associated with cams 200 and 204 will cause cam 204 to be locked in position while continued rotation of shaft 64 and consequent movement of crank 166 will impart through toggles 167 and 168 forward movement of shaft 170 and the cutter head 177. Cutter head 177 will advance to and through the head of can 68c causing a puncture therein. Forward movement of shaft 170 and cutter head 177 will then be arrested and reversed, withdrawing the cutter head from the can puncture and permitting the fluid contents of the can to drain into catch basin 190 thence through tube 70 and into reservoir 71. During the period of withdrawal of the cutter head 177 from the punctured can head, normal rotation of gear 63 will have continued to a point where lug 163 meets the end 196 of pivoted arm 193 and causes the remote end thereof, 197, to contact an arm on micro-switch 198, Fig. 9. The contacting of micro-switch 198 opens and de-energizes the entire primary circuit thereby de-energizing motor 31 and immobilizing all movable parts driven thereby. It will be understood that the described linkage and cam system of the opener or punch assembly is so calculated and arranged and the operating cycle thereof for example as diagrammed in Fig. 25 is made such that complete or substantially complete drainage of each successively presented can is effected within a delay interval prior to actuation of micro-switch 198 (marked "cam oper. sw. 198" on Fig. 30) by the described engagement of lug 163 with the switch-operating arm 193. Thus the fluid contents are emptied from the opened can 68c prior to completion of the cycle. Drainage of the contents from a can begins immediately when the cutter head 177 pierces the can and the rapid withdrawal of the cutter facilitates emptying of the can. In this connection it is also noted that the attendant replenishment of the reservoir 71 from the emptying can raises float 129 and throws off the micro-switch 315.

The resumption of movement of shaft 61, worm gear 62, drive gear 63, shaft 64 and cam 200 will permit cam 200 to make a complete cycle and again impart a quarter cycle revolution to cam 204. This quarter cycle revolution of cam 204 will advance can 68c beyond the outer margin of the outermost spider or fin 181 which supports it (note Figure 5 of the drawings) and will permit the empty can to roll by gravity onto inclined lip 55a where it will roll down and into a space 58 between two adjacent ladder rungs 57 in the can-pathway. The same movement will advance can 68b to position 68c and will permit a repeated can-punching cycle if necessary.

Whether or not a second can-punching cycle on a second can will immediately ensue will depend upon the adjustment of float 129 with relation to micro-switch 315 and whether or not the fluid drained into reservoir 71 has reached a level therein which will have raised float 129 to a point where contact arm 313 has broken contact with switch arm 314 thereby opening micro-switch 315 and opening and de-energizing the motor circuit. If the foregoing increase in the level of the fluid in reservoir 71 has not been sufficient to raise float 129 and break contact between 313 and 314, a second can-punching cycle will ensue in order to fill reservoir 71 to a point where contact between 313 and 314 is definitely broken and through switch 315 the drive motor circuit is de-energized.

Reservoir 71 having been filled to a desired level with fluid, my apparatus is now in a position to dispense fluid in response to coin deposits. In its normal and static condition cylinder 102 at the bottom of reservoir 71 will be in its uppermost position. In this position, ports 110 are at a level above the top edge of housing 74 permitting some fluid within reservoir 71 to drain through ports 110 and into the interior of cylinder 102. Plate 105 will be firmly held against the bottom edge of housing 74 by the action of spring 117. The deposit of a coin in the coin receptacle actuates a coin controlled switch such as that marked "5¢ coin sw.," Fig. 30, upper left, which closes the circuit which controls the conventional cup dispensing motor and the associated cup-releasing and circuit-timing cams thereof, which motor and cam unit is marked "vending motor" on Fig. 30. The rotation of the cup dispensing cam first drops an empty cup into position below the pouring spout 39 and continued rotation of the timing cam of said cup-dispensing or vending motor closes a micro-switch associated with said vending motor and cam unit and marked "cam oper. sw." on Fig. 30 at the left thereof opposite the vending motor which closes the circuit energizing solenoid 77 marked "dispensing solenoid" on Fig. 30. The energizing of solenoid 77 will expel solenoid core 310, the downward movement of which will lower cylinder 102. This descending movement of cylinder 102 continues, (until stop plate 107 rests upon the upper edge of housing 74) closing ports 110 and exposing ports 112 below the bottom edge of housing 74. The fluid contents heretofore confined within cylinder 102 fall by gravity into catch basin 100, thence flow through extension 75 and into the upper end of pouring spout 139.

After the lapse of the predetermined time for filling a cup the previously mentioned cam-operated switch associated with the vending motor is by the cam thereof automatically cut off thereby opening the circuit and de-energizing solenoid 77, permitting core 310 to rise to its normal elevated position within the solenoid. This elevating movement of core 310 lifts rod 103 and the upward movement thereof is boosted by spring 117, consequently cylinder 102 is quickly elevated until plate 105 rests against the bottom of housing 74 and stops further upward movement. At this point, ports 110 are again uncovered and fluid from reservoir 71 will again fill the cylinder 102.

After the cup-dispensing or vending motor has rotated the cam to open the switch in series with dispensing solenoid 77, further rotation of this motor opens the switch identified as "trip switch, cam operated," Fig. 30, whereon the dotted line indicates mechanical association. Opening the latter switch opens the coil of the vending relay, de-energizing the vending motor, and thus terminating the vending cycle. As is the practice in automatic vending machines, while the vending relay is energized and a vending cycle is in progress, one of the contacts of the vending relay prevents acceptance of coins by the coin mechanism by de-energizing the coils identified as "10—25¢ electro-magnet" and "5¢ relay."

The upward and downward movement of rod 103 described above will cause reciprocating motion of agitating plate 108, thus tending to agitate, and make homogeneous, the fluid contents in reservoir 71. In dispensing the juices of certain fruits and vegetables, which may contain particles of solid matter in suspension, such agitation is found desirable in preventing stratification and potentially undesirable deposits of sediment at the bottom of reservoir 71.

It will be understood that repeated incremental withdrawals of fluid in response to individual purchases, will tend to lower the level of fluid in reservoir 71 and eventually will lower float 129 to a point where contact elements 313 and 314 will activate switch 315 in order to energize motor 31. When this occurs an additional can is punched and its fluid contents drained into reservoir 71 to augment the fluid therein to a desirable level. The foregoing cycles can be continued until the contents of all cans previously loaded in the can pathway have been emptied into reservoir 71 and dispensed.

It will be observed by those skilled in the art that the dimensions of housing 74 and of cylinder 102 which operates therein, can be computed so as to utilize these two elements as a measuring device for dispensing a measured quantity of fluid. Desirably this measured quantity of fluid will be calibrated with regard to the desired size of cup into which the fluid is to be discharged.

d. Sequential operations of the can-advancing unit

In the foregoing description, both elemental and operational, I have referred somewhat in generalities to the can-advancing mechanism formed by cams 200 and 204 and their associated parts. Further detailed description is believed desirable and for the purpose of this description I have illustrated a cycle of operation of these units in Figures 17, 18, 19, and 20 of my drawings. It will be assumed for the purpose of this explanation that in the position shown in Figure 17 a previously punctured and empty can will be cradled between the two uppermost fins or spiders 181a and 181b. Cam 200 through the movement of its shaft 64, is rotating in a clock-wise direction with crank pin 201 in a position designated 201a. As cam 200 rotates through a quarter revolution pin 201a moves to the position shown in 201b, as in Figure 18. Such rotational movement of pin 201 advances rod 203 the latch head 209 of which is engaged with pin 205 on cam 204, thus causing a quarter revolution of cam 204. This quarter revolution of cam 204 brings pin 208 to bear on the under edge of rod 203 elevating it as movement of cam 204 continues through the balance of the quarter revolution. The elevation of rod 203 disengages notch 210 from pin 205. Such disengagement deprives cam 204 of any force tending to rotate it so that cam 204 now remains stationary. Continued movement of cam 200 carries pin 201 to the position shown in 201d (Figure 20); such continued movement tends to withdraw rod 203 and its latch head 209 to a position where under the urging of spring 223 it will tend to engage pin 205 in notch 210.

Meanwhile to provide a positive stop for cam 204 the outer surface or peripheral edge of cam 200 has been cut away to provide the depressed cam surface between shoulders 216 and 217. The extension 221 on rocker arm 220 travels around the cam surface of cam 200 until it falls within the depressed surface between shoulders 216 and 217. Up until this point the opposite end of rocker arm 220 has been held in locking engagement with notch 214 on cam 204 by latch 209. As extension 221 travels across the depressed cam surface between 216 and 217 it reaches shoulder 217 and rides up onto the raised cam surface. This pulls extension 222 out of engagement with notch 214 and permits the completion of the quarter revolution of cam 204 imparted by rod 203. Shoulder 217 on cam 200 is placed at such a point that when extension 221 passes the shoulder and commences to ride on the elevated cam surface between 217 and 216, extension 222 is forced into locking engagement with notch 213. During travel of extension 221 between 216 and 217 on the depressed surface of cam 200, cam 204 is unlocked and rotates through a quarter cycle. During the travel of 221 between 217 and 216 on the elevated surface of cam 200, cam 204 is held immobile.

In general, it will be seen that I have provided an arrangement of elements which will permit cam 200 to perform a complete cycle of revolution, that is to say a 360° cycle, while cam 204 is moved but a quarter cycle, that is, through an angle of but 90°, and then is positively locked in position. While I prefer the foregoing arrangement as one which I have found to be relatively simple and positive in its operation, there are other means of permitting shaft 64 and its supported elements to rotate through 360° while limiting shaft 180 and its supported elements to a quarter revolution of but 90°. One such arrangement I have shown in Figure 29 of my drawings and briefly described earlier herein wherein a drive gear 300 is mounted on shaft 64 while a driven gear 303 is mounted on shaft 180. Gear 300 is provided with teeth 301 on only one-quarter of its periphery. The teeth 301 are adapted to mesh with the teeth of an intermediate gear 302, the teeth of which likewise mesh with the teeth of driven gear 303. In this arrangement rotation of gear 300 on its shaft 64 will rotate intermediate gear 302 and driven gear 303 only during the quarter revolution when the teeth 301 are in contact with the teeth 302. During the remaining three-fourth cycle of revolution of gear 300, gears 302 and 303 remain stationary. In order to provide a positive lock on gear 303, and its shaft 180, so as to prevent rotation thereof during a three-fourth cycle, I mount on pedestal 218 a lever arm 220 the ends of which, 221 and 214, cooperate with cams 200 and 204 mounted on shafts 64 and 180 respectively, in the identical manner that the arm 220 functions in association with cams 200 and 204 as illustrated in Figure 10 of my drawing. The real difference is that in the modification of Figure 10 the pivoted arm 220 is held against the cam surfaces of cams 200 and 204 by the action of spring 223 while in the present modification, shown in Figure 29 of my drawings, the weight of the arm 220 permits, through the force of gravity, the ends thereof to move around the cam surfaces during rotation of shafts 64 and 180. It will be understood that if the weight of the arm 220 is not sufficient to accomplish this job, suitable springs, or a spring may be connected between arm 220 and a desired position on pedestal 218 to afford more positive action. By this arrangement it will be seen that, similar to modification of Figure 10, the present modification permits shaft 180 and the cam supporting pins 181 to be rotated a quarter revolution and then locked against further movement while shaft 64 completes a 360° revolution.

e. Sequential operations of the can-punching unit

In the foregoing description, both elemental and operational, I have referred somewhat in generalities to the can-punching unit formed by shaft 170, cutter head 177 and their associated parts. Further detailed description is believed desirable and for the purpose of this description I have illustrated these elements in Figure 11 and have illustrated a cycle of operation in Figures 21, 22, 23, and 24. I have also illustrated in Figure 25 a diagrammatical representation of the movement of the cutter head 177 in response to movement of plate 161 and pin 162 through a complete cycle of 360°. In each of Figures 21, 22, 23, and 24 I have shown by the lines C—C the position assumed by the top or head of a can being punched. It should be understood that the eccentricity of pin 162 with respect to the axis of shaft 64 and the peripheral movement of plate 161 is such that when movement is imparted to the crank arm 166 and the toggle linkages 168 and 169 shaft 170 is reciprocated in a horizontal plane. The reciprocating movement of shaft 170, and with it the cutter head 177, is carefully controlled so as to permit the cutter head to be advanced to and through the can head to puncture the same, promptly withdrawn so as to free the punctured opening and permit the fluid to drain out of the can and lastly to assume a position of readiness free of the can for a further cycle, if desired. Meanwhile, this reciprocating movement of shaft 170 is, through the rotation of shaft 64, cams 200 and 204, carefully correlated with the can advancing unit heretofore described.

Figure 21:
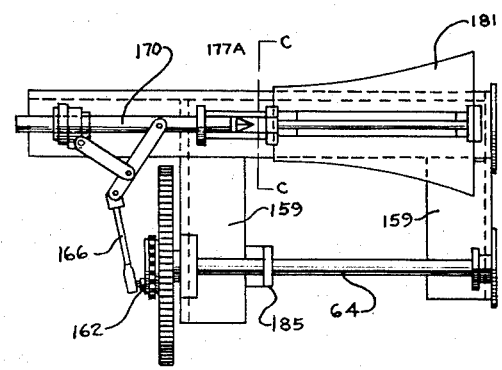
Figure 22:
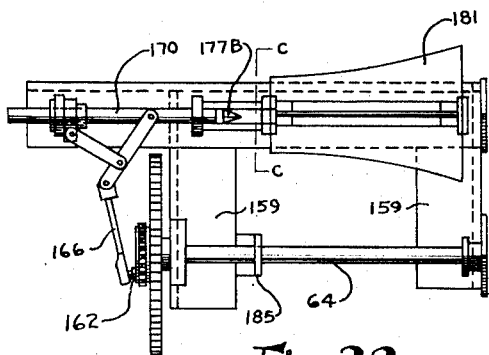

In general, gear 65 and plate 161 are disposed in parallel vertical planes. Consequently, plate 161 as viewed from a position in front of the axis of shaft 64, upon which it is mounted, will present a circular outline which might be simulated to a clock face. In general also, and with reference to such a simulated clock face, the initiation position in which a cycle of rotation of pin 162 starts is in a clock position between "four and five o'clock." Referring to Figure 25 of the drawings and more particularly to the circular diagram thereof, this position would be on the radius $a$. This same position is shown in Figure 21 of the drawings in which it will be observed that the position of cutter head 177 is in front of, but clear of, the can head and is at a position designated 177a. Rotation of disc 161 and pin 162 in a counter-clockwise direction will at first retract shaft 170 and draw cutter head 177 away from the can head. Such withdrawal is represented on Figure 25 as between the points $a$ and $d$. During this stage of the cycle, cutter head 177 assumes the position shown at 177b in Figure 22.

Figure 23:
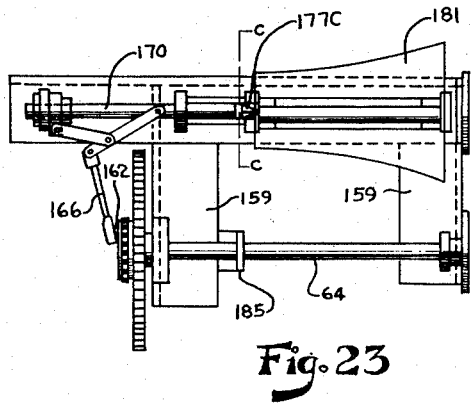
Figure 24:
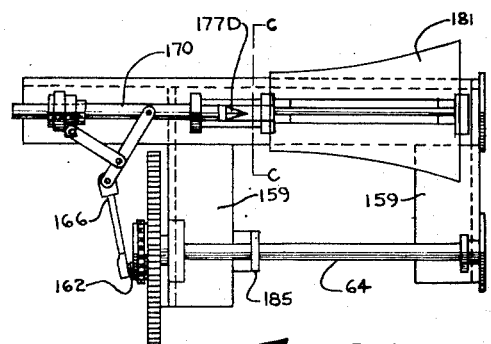

Further rotation of disc 161 and pin 162, operating through toggles 168 and 169, advance shaft 170 and cutter head 177 toward the can top until a point is reached where the cutter head 177 penetrates the can top and makes an opening therein. This position is illustrated in Figure 23 wherein the cutter head position is designated 177c. Referring to Figure 25 of the drawings such movement of the shaft 170 is represented between the points $e$ and $q$.

Continued rotation of plate 161 and pin 162 at this point will initiate a retraction of shaft 170 and the withdrawal of cutter head 177 from the can top. Desirably the withdrawal will be speedily accomplished and this phase of movement takes place during the downward movement of pin 162 as diagrammatically represented between points $q$ and $v$ as shown on Figure 25 of the drawings. Further continued rotation of plate 161 and pin 162 will impart relatively little movement to shaft 170 so that it assumes a fairly static position between points $v$ and $a$ on Figure 25.

f. Automatic operations of the unit illustrated in Figures 27 and 28

In major operative principles, the devices illustrated in Figures 5 and 27 of my drawings are similar. They differ, however, in some details of construction and operation.

Thus in lieu of the can pathway in which the cans are positively propelled by the chains 51 and ladder rungs 57 of Figure 5, Figure 27 shows a different mode of storing and moving cans on and down an inclined can pathway. The arrangement which I term gravity feed, permits the cans to be inserted through port 400 and individually rolled down inclined tracks 401, 403, 405 and thence to the final inclined track 67. The operation of the can-advancing and can-punching units in the two modifications is substantially the same as that described with reference to Figure 5. However, I employ certain details of construction in the manner of driving the can-advancing and can-punching units which are different. Thus in lieu of a positive drive from vertical shaft 34 translated to horizontal shaft 61 (of Figure 5) I employ a plurality of horizontal shafts 408 and 413 on which are mounted drive pulleys 410 and 412 which permit shaft 413 to be rotated by a belt drive. At the end of shaft 413 and at the corresponding end of shaft 61 I have a disengaging clutch arrangement adapted to be placed into operative contact upon energizing solenoid 422 the movement of which is imparted to clutch face 416 through toggles 419 and 423. When solenoid 422 is energized and clutch faces 416 and 414 are in engagement, shaft 61 is rotated to drive gear 63 and permit the performance of a cycle of can-advancing and can-punching operations as heretofore described. When clutch faces 414 and 416 are disengaged, shaft 413 idles without rotating shaft 61 in this arrangement.

When operatively driven full can 68a advances to position 68b whence it is picked up and cradled on pins 181 for the can-punching cycle. A further quarter cycle movement of the can-advancing unit discharges can 68c, now empty, and permits it to fall by gravity into a suitable can-pathway leading to a receptacle for the collection of empty cans. In this case, as with the modifications of Figure 5, rocker arm 193 is forced by a pin on gear 63 into contact with micro-switch 198 which will cut off the energizing circuit controlling solenoid 422 and through the toggles 419 and 423 will withdraw clutch face 416 from engagement with clutch face 414. Micro-switch 198 similarly as in the previously described example of the earlier figures will automatically cut off and reclose the energizing circuit controlling solenoid 422. This will permit the resumption of the can-moving and can-punching cycle after a lapse of time sufficient to permit the fluid to drain from punctured can 68c.

The details of construction and operation of reservoir 71 and valve 436 are somewhat different. A belt 427 connects shaft 408 with shaft 429 through pulleys 409 and 428 so as to rotate shaft 429. A worm gear 449 adjacent the end of shaft 429 cooperates with and rotates a horizontally disposed gear 450 which is affixed to collar 474 embracing rod 103. The rotation of this gear 450 and collar 474 rotates the paddles 476 to agitate the fluid within reservoir 71. Float 129, suspended by pivoted arm 423, has an exterior contact arm 435 for establishing contact with micro-switch 315 when float 129 is lowered. The purposes and functions of micro-switch 315 are the same in this modification as they are in that of Figure 5. Shaft 448 is supported on an extension of a pivoted arm 460 and is adapted to be raised or lowered responsive to toggles 458 and 461 which in turn are responsive to reciprocating movement of shaft 430. When arm 460 is in its lowermost position, shaft 448 is lowered to a point which permits meshing of the teeth of worm gear 446 and driven gear 447. Rotation of gear 447 moves crank arm 472 which is eccentrically attached to gear 447 and through toggle arms 467 and 471 elevates or lowers rod 103. Rod 103 when elevated lifts valve head 437 and permits the interior of housing 74 to be filled with fluid from the interior of reservoir 71. During this operation disc 433 is held firmly seated against the bottom of housing 74 so as to retail all fluid therein. Reverse or lowered movement of rod 103 first seats plate 437 so as to seal off the upper edge of housing 74 and then continued movement downwardly causes the bottom of rod 103 to press on plate 438 and depress it against the resistance of coil spring 480. By further downward movement of rod 103, plate 438 is eventually unseated, permitting the contents of housing 74 to drain into catch basin 100 and thence drain into the pouring spout.

The rotation of the conventional cup-dispensing motor and cup-dispensing cam, previously referred to, will cause rotation of the shaft on which this cam is rotating. A suitable lever attached to this cup-dispensing cam shaft moves arm 500 and forces plate 431 to close micro-switch 432. The closing of micro-switch 432 closes the circuit which controls drive motor 31 and initiates rotation of shaft 429.

Experience has indicated to me that while both positive means for advancing cans in a can-pathway and gravity feed means, as illustrated in Figure 27, are operative and useful, there are some minor disadvantages to the gravity feed arrangement. Careless operators may charge into the can magazine a can which has been dented or otherwise marred with respect to its normal peripheral surface. Such a can may tend to bind or lodge on the inclined tracks and cause a jam of the cans behind it. Such a defect is easily remedied if it occurs. But since careful workmen are not always easy to find, I prefer the can-pathway and its positive movement of the cans in preference to the gravity feed arrangement. Moreover, the arrangement shown in Figure 27 does not permit as readily and easily the removal of reservoir 71, housing 74 and basin 100 for cleaning purposes. All the features, however, of the modifications on Figure 27 are completely operative and will produce the desired result.

My invention possesses a number of distinct and important advances over any prior device of which I am aware. By my arrangement I provide a reservoir of adequate but limited capacity so that when filled with a fluid which has been known to deteriorate under unfavorable atmospheric or temperature conditions only a relatively small quantity of fluid is retained in the reservoir wherein under shut-downs or like conditions it might conceivably be subject to adverse conditions. The balance of the fluid to be dispensed by my invention is retained fully sealed in a plurality of cans the contents of which are automatically made available when desired. Moreover, the housing 74 in cooperation with cylinder 102 provides a measuring valve which permits measured increments of the fluid to be withdrawn rapidly and as desired.

I do away entirely with the unsatisfactory expedients heretofore deemed essential such as utilizing synthetic fruit juices and providing some means of carbonating them to make them at all palatable. But most importantly, however, I make available for individual and automatic purchase and consumption, beverages such as fruit or vegetable juices which can be packed when fully ripe and whose taste and nutritional value can be preserved indefinitely.

Moreover, my invention possesses a high degree of sanitation. Desirably all the parts which are brought in contact with fluids may be made of stainless steel or may be glass lined. The same parts are adapted for easy removal, cleaning, sterilization and replacement so that a purchaser of the beverage dispensed by my invention need not be subject to fermented or distasteful beverages. Consequently, even when the fluids to be dispensed are fruit juices or vegetable juices which have an acid content, there is no danger of the corrosion of parts generally experienced with metallic surfaces exposed to such acids.

Figures 15, 16:
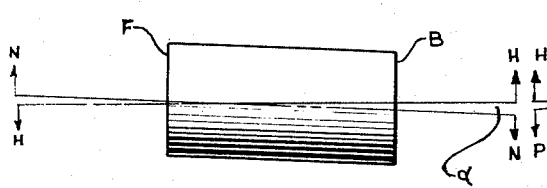
Figure 15 is a detailed side view of a can showing its position, and the deviation from a horizontal position, during all movement around the track except during the can-punching operation.
Figure 16 is a detailed side view of a can showing its position and the deviation from a horizontal position during the can punching operation.
Figure 14:
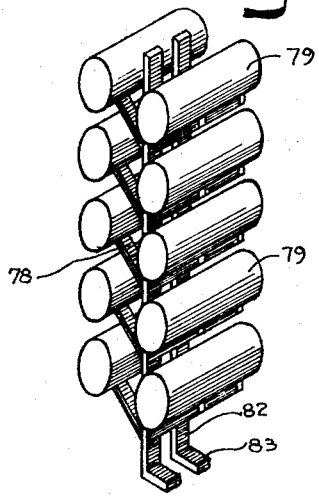
Figure 14 is a side elevation, in perspective, of an auxiliary can support or "hat rack" adapted to be placed within free space in the refrigerated compartment of my cabinet.
Figure 17:
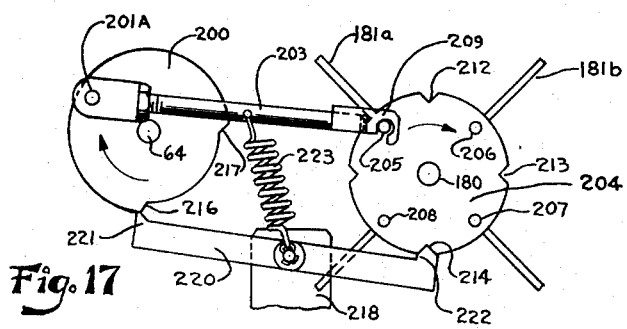
Figure 18:
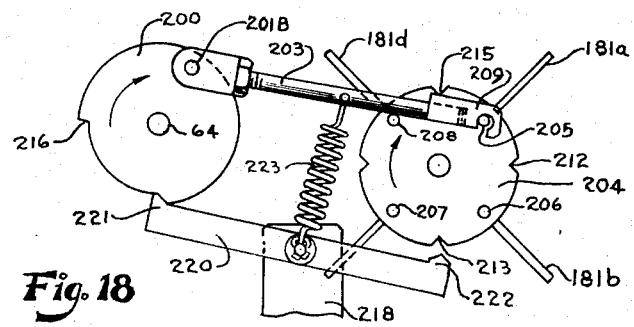
Figure 19:
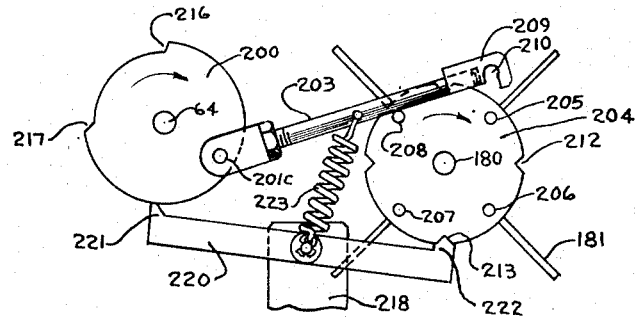
Figure 20:
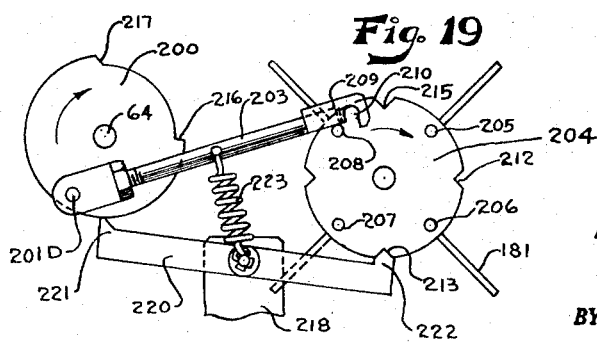

One of the features of my invention which I have not heretofore emphasized is the arrangement which I have provided for moving the full and empty cans in my can-pathway. It will be noted that the ladder rungs 57 are tapered so as to be thicker at one end than they are at the other. The cans will normally be placed, when charging my device, with the can head, that is to say the end which is to be punched, adjacent the larger end of the supporting rung 57. The can will therefore be supported with its head at a somewhat higher elevation than the can bottom. In other words, there will be an angular deviation between the major axis of the can and an axis which is truly horizontal. Referring to Figure 15 of the drawings, this angular deviation is represented by $a$, being the angular deviation between a truly horizontal axis, H—H, and the axis, N—N, of the can when in its normal supported position.

The purpose of this inclination of the cans while in the can-pathway is of not so much importance when the can is full and sealed. However, after the can has been punctured and has again been returned to the can-pathway, small increments of fluid will be retained on the interior walls of the can and unless prevented would drain out of the can in the passage of time and spatter over the lower portions of the interior of my cabinet. By using this inclination of the can from front to back, any such retained fluid increments tend to drain toward the unpunctured bottom of the can and are not permitted to spatter out of the can.

During the punching operation, however, such an inclination of the can would be undesirable for I deem it advantageous to permit the contents of the can to drain out thereof as rapidly as possible after the can head is punctured. Consequently, when a can such as 68b is cradled on the pins 181 it is desirable for the can head to be at a lower elevation then the can bottom. This inclination of the can during the can-punching cycle, I have illustrated in Figure 16 of my drawings, where, as in Figure 15, H—H represents an axis parallel with the horizon while P—P represents the major can axis during the can-punching cycle. The angular difference between these two axes I represent as $\beta$. In general, the angle $\beta$ will be somewhat greater than $\alpha$ as is representatively shown in Figures 15 and 16.

The inclination $\beta$ of the can during the can-punching operation I have found to be desirable in both the modifications illustrated in Figure 5 and Figure 27 of my drawings. However, the inclination of the can as represented by the angle $\alpha$ in Figure 15 of my drawings, I have found to be of considerably more importance in the modification of Figure 5 than in the modification of Figure 27. Prior to the puncturing of a full can and while on a gravity feed can-pathway, it is desirable that the cans be permitted to roll as freely as possible. I therefore deem it desirable that the cans roll down the gravity feed pathway with their major axes in a substantially horizontal position. Moreover, after the can has been punctured in the gravity feed modification, I deem it expedient that the empty cans be discharged into a chute where they are free to fall, instantly, into a removable receptacle preferably housed in the space 15 at the bottom of my cabinet. Under such an arrangement, the empty cans will drop so rapidly to the ultimate container that there need be no provision for maintaining any angular inclination thereof to minimize incremental drainage therefrom.

I do not now believe that a particular shape of the cutter head 177 of the can opening, cutting or puncturing unit 69 and the can-puncturing formed thereby is possessed of paramount advantages over other shapes. I have found to be entirely satisfactory a cutter head which is triangular in cross-section, with the apex of the triangle being at the top. Such a cutter head would preferably be pyramidal, with the apex of the pyramid coincident with the outer point of the cutter head. The cutter head may desirably be fabricated of corrosion resistant steel of a quality and temper which will permit sharpening of the cutting point and edges when desired. I prefer that cutter head 177 be so positioned with relation to the can top to be punctured that the puncture is made at the bottom peripheral edge of the can-top. A cutter head such as I have just described will make a triangular shaped puncture, which, particularly if the cutter head is large enough, will suffice to permit egress of fluid from the can while permitting ingress of air thereinto.

Referring again to my invention as illustrated hereabove it will be seen that I have provided a dispensing device which possesses many distinct virtues and advantages over anything in the prior art. My cabinet is mobile and requires only a suitable source of electric current. Consequently, it may be moved about as desired. It does not possess the prior art disadvantage of requiring any fixed water connections or pipes, nor is it associated with any carbon dioxide containers or cylinders such as prior art devices have required. The fluid to be dispensed is dispensed from the containers herein illustrated as cans which, full or empty, are always housed within the cabinet. Therefore, there is no danger from glass from bottles which might accidentally break within the cabinet or which might be left around in the vicinity of the cabinet by previous purchases.

There is, moreover, one very fundamental advantage to my device and that arises from its sanitary qualities. In modern packing plants such as tomato juice canneries, citrus fruit canneries and the like, the fruit or vegetable is practically never touched by human hands after it is picked from the vine or tree. My invention makes it possible for a juice so uncontaminated to be dispensed in a sanitary cup without ever having been subsequently touched by human hands. It can thus be said that my device will dispense a fluid which has never been touched by human hands except during the original picking or harvesting of the ripened fruit or vegetable.

While, in the foregoing specification I have referred to beverages such as fruit juices or vegetable juices as canned fluids which may be dispensed, I wish it to be understood that I do not intend my invention to be limited to such beverages. Other beverages such as mixed fruit or vegetable juices, milk or beer or the like could be dispensed from cans or sealed containers. Nor do I consider that my invention is limited to canned beverages. Other fluids such as lubricating oils or the like which are conventionally packaged in cans may be dispensed by my invention. When so used my invention would provide a very useful adjunct in service stations which are provided with coin-operated automatic gasolene-dispensing pumps.

I claim:

1. A vending apparatus comprising means for supporting a plurality of fluid-containing sealed containers, a fluid reservoir for reception of a quantity of the fluid to be dispensed, means responsive to a minimum quantity of fluid in said reservoir to puncture one of said containers and permit the contents thereof to be discharged into said reservoir.

2. The apparatus defined in claim 1 wherein there are connected with said reservoir means for withdrawing and dispensing increments of the fluid maintained in said reservoir.

3. A vending apparatus for fluids comprising in combination supporting means for a series of fluid-containing sealed cans, a fluid reservoir to be supplied from the cans, coin-controlled means to dispense fluid increments from the reservoir, means whereby the cans successively advance on the supporting means on depletion of fluid in the reservoir, and can opening means to effect discharge of the content of the leading can to the reservoir.

4. A dispensing apparatus for fluids comprising a cabinet, supporting means in the cabinet for a plurality of fluid-containing sealed cans, a fluid reservoir to be supplied from the cans, means to puncture a can for discharge of the content to the reservoir, the can supporting means defining a pathway along which the cans are successively progressed to the puncturing means, and control means for the can supporting and presenting means responsive to predetermined removal of fluid from the reservoir supply.

5. A dispensing apparatus for fluids comprising in combination a movable conveyor to support a series of fluid-containing sealed containers, a fluid reservoir to be supplied from the containers, a container positioning station at which the content of a container is emptied to the reservoir, container opening means at said station, and conveyor drive means controlled by the fluid level in the reservoir to present the containers seriatim in opening position at the station.

6. Dispensing apparatus for fluids comprising container and support means for a plurality of fluid-containing sealed cans, a reservoir, pathway means for serially presenting the cans at an opening and draining station, can wall piercing means at said station and operable on a presented can to release the content thereof to the reservoir, movable means for withdrawing and dispensing a measured increment of fluid from the reservoir, and means whereby measured removal of fluid from the reservoir causes a sealed can to be presented and the content thereof released to the reservoir.

7. Fluid vending apparatus adapted for coin control comprising a housing, a fluid-collecting reservoir therein, can opening means to release the content of a can for collection in the reservoir, measuring means to withdraw and discharge a determined increment of fluid from the reservoir, a plurality of can supports movable along a pathway whereby full cans are progressively moved toward the opening means and opened cans are progressively moved away therefrom, and reservoir-fluid responsive means controlling the can moving and opening means.

8. Fluid vending apparatus adapted for coin control comprising a refrigerable cabinet, a fluid-collecting reservoir therein, can opening means, presenting means whereby individual fluid-containing sealed cans are successively subjected to the opening means for release of the can content to the reservoir, measuring means for dispensing determined increments of fluid from the reservoir for use, and a control whereby predetermined dispensing of the reservoir fluid effects actuation of the presenting and can opening means.

9. Fluid vending apparatus adapted for coin control comprising a refrigerable cabinet, a fluid-collecting reservoir therein, can opening means, travelling conveyor means for progressing a plurality of fluid-containing sealed cans toward the opening means and opened cans away from it and for presenting and holding a can during an opening operation thereon, dispensing means for increments of fluid from the reservoir, and control means rendering the can conveyor and opening means operatively responsive to the amount of fluid in the reservoir.

10. Fluid vending apparatus adapted for coin control comprising in combination a housing, a fluid-containing reservoir therein, can puncturing means, conveyor means along which fluid-containing sealed cans are advanced toward the puncturing means, can transfer means to present and hold a given can for puncturing and draining, and first and second rotatable driving elements associated with the puncturing means and the transfer means, the second element having a periodic actuation controlling presentation and stationary holding of the can and the first element effecting said periodic actuation of the second and also actuation of the puncturing means while the can is held.

11. In a coin-controlled vending machine, in combination, a housing containing a reservoir and associated means whereby the fluid content of sealed individual cans is intermittently supplied thereto from a plurality of such cans in the machine, measuring means for withdrawing a predetermined portion of fluid from the reservoir while retaining the remaining fluid therein, dispensing means receiving the fluid from the measuring means, and control means whereby depletion of the reservoir fluid initiates the supplying of fluid from another can of the plurality to the reservoir.

12. In a coin-controlled vending machine according to claim 11 the combination wherein the fluid measuring means comprises a valve having an actuating solenoid.

13. In a vending machine wherein fluid is maintained in a reservoir by intermittently and successively opening fluid-containing sealed cans maintained within said machine and fluid from the opened cans is collected in the reservoir, means for withdrawing a predetermined measured portion of fluid from the reservoir while retaining the balance of the fluid in the reservoir, and means responsive to the level of retained fluid in the reservoir and automatically operable to put in motion can-opening means whereby to open a can and permit its fluid to augment the fluid in the reservoir.

14. In a fluid dispensing machine including a housing wherein a plurality of sealed fluid-containing cans is maintained in refrigerated condition, means for selecting one of said plurality of cans and moving it to a can-opening position, means for immobilizing the can in said position, means for puncturing the can while in said immobilized position and thereby permitting fluid contents to drain from the can, a reservoir adapted to receive and hold the fluid subject to dispensing, said can moving, immobilizing and puncturing means being operable in intermitting cycles, and control means for automatically instituting an operating cycle thereof upon dispensing of the fluid.

15. In a fluid dispensing machine, a housing arranged to maintain a series of fluid-containing sealed cans therein, can transfer means for selecting a can of the series and moving it to a can-opening position, means for immobilizing the selected can and for puncturing it while so immobilized, collecting means for the fluid content from the opened can to retain it subject to incremental dispensing, and control means correlating the transfer, immobilizing and puncturing means with a reduced fluid content status of the collecting means.

16. A fluid dispensing machine according to claim 15 including can supporting means whereby before and after opening the cans are maintained with their major axes parallel.

17. A fluid dispensing machine according to claim 15 including a movable conveyor for carrying the sealed cans in succession to the transfer means and for attendantly receiving the opened cans therefrom.

18. A fluid dispensing machine according to claim 15 wherein an inclined can pathway formation is provided for gravity feed of the cans to the transfer means.

19. A fluid dispensing machine according to claim 15 in which the can transfer means presents the selected can in the immobilized opening position with the major axis thereof tilted with respect to the horizontal.

20. In a vending machine, a reservoir wherein fluid is supplied by intermittently and successively presenting and opening fluid-containing sealed containers held in a pathway in the machine and releasing the opened container contents to the reservoir, means to withdraw a predetermined measured portion of fluid from the reservoir while keeping remaining fluid therein, means for dispensing the measured fluid portion so withdrawn, and means acting upon withdrawal of the reservoir fluid to initiate replenishment thereof from another sealed container.

21. Apparatus for handling liquid from sealed containers, comprising supporting means for a plurality of containers whereby they are serially presented individually, a fluid chamber, means for supplying to the chamber fluid from a presented container, means for withdrawing fluid from the chamber, and control means whereby depletion of the chamber fluid activates the fluid supplying means.

22. Apparatus for handling liquid from sealed containers, comprising a container holding station, means for presenting sealed containers serially to said station, a fluid chamber, means at said station to form an outlet on a container thereat for flow of the fluid content to said chamber, means for conducting fluid from the chamber, and control means whereby depletion of the chamber fluid causes operation of said outlet forming means at said station and presentation of a sealed container thereat.

ROBERT W. JOHNSON.

REFERENCES CITED

The following references are of record in the file of this patent:

UNITED STATES PATENTS

| Number | Name | Date |
| --- | --- | --- |
| 1,740,186 | Lippold | Dec. 17, 1929 |
| 1,779,839 | Biglow | Oct. 28, 1930 |
| 1,998,263 | Townsend | Apr. 16, 1935 |
| 2,002,753 | Parks et al. | May 28, 1935 |
| 2,333,118 | Olsen | Nov. 2, 1943 |